US012617629B2

(12) United States Patent
Chapin et al.

(10) Patent No.: US 12,617,629 B2
(45) Date of Patent: May 5, 2026

(54) MEDICATION CONTAINER AIR SORTING SYSTEM AND APPARATUS

(71) Applicant: Innovation Associates, Inc., Johnson City, NY (US)

(72) Inventors: Fletcher L. Chapin, Johnson City, NY (US); Edward Mungo, Johnson City, NY (US); Jacob Chandler Jackowski, Johnson City, NY (US); Carrie Hathaway, Johnson City, NY (US)

(73) Assignee: Innovation Associates, Inc., Johnson City, NY (US)

( * ) Notice: Subject to any disclaimer, the term of this patent is extended or adjusted under 35 U.S.C. 154(b) by 39 days.

(21) Appl. No.: 18/612,792

(22) Filed: Mar. 21, 2024

(65) Prior Publication Data

US 2024/0317506 A1 Sep. 26, 2024

Related U.S. Application Data

(60) Provisional application No. 63/453,977, filed on Mar. 22, 2023.

(51) Int. Cl.
| | |
|---|---|
| *B65G 43/08* | (2006.01) |
| *B65G 15/40* | (2006.01) |
| *B65G 15/44* | (2006.01) |
| *B65G 47/256* | (2006.01) |
| *B65G 47/28* | (2006.01) |
| *B65G 47/52* | (2006.01) |
| *B65G 47/74* | (2006.01) |

(52) U.S. Cl.
CPC ............. *B65G 43/08* (2013.01); *B65G 15/40* (2013.01); *B65G 15/44* (2013.01); *B65G 47/256* (2013.01); *B65G 47/28* (2013.01); *B65G 47/525* (2013.01); *B65G 47/74* (2013.01); *B65G 2201/0235* (2013.01); *B65G 2203/0225* (2013.01); *B65G 2203/044* (2013.01); *B65G 2203/047* (2013.01)

(58) Field of Classification Search
CPC .......... B07C 5/36; G06Q 50/04; B65G 47/14; B65G 15/40; B65G 47/74; B65G 2201/0244; B65G 47/525; B65G 47/256; B65G 43/08
USPC .......................... 198/428, 380, 401, 438, 493
See application file for complete search history.

(56) References Cited

U.S. PATENT DOCUMENTS

| | | | | |
|---|---|---|---|---|
| 4,214,663 A | * | 7/1980 | Schopp ................... | B07C 5/361 |
| | | | | 209/552 |
| 5,065,858 A | * | 11/1991 | Akam .................... | B65G 51/03 |
| | | | | 406/88 |
| 5,236,077 A | * | 8/1993 | Hoppmann .......... | B65G 47/525 |
| | | | | 198/395 |

(Continued)

FOREIGN PATENT DOCUMENTS

| | | | | |
|---|---|---|---|---|
| DE | 102006039091 A1 | * | 2/2008 | ........... B65B 7/2807 |

*Primary Examiner* — James R Bidwell
(74) *Attorney, Agent, or Firm* — K&L Gates LLP

(57) ABSTRACT

A system and apparatus for a medication container sorting apparatus by air sort station is disclosed. The container sorting apparatus includes a transport mechanism, a bumper rail, an air nozzle, a valve, and a sensor. As medication containers pass by an air nozzle on the transport mechanism, the air nozzle blows air towards the containers to push those with a closed end facing the air nozzle towards an opposite side of the transport mechanism. A bumper rail is used to prevent the medication container from falling off of the transport mechanism.

20 Claims, 26 Drawing Sheets

(56) References Cited

U.S. PATENT DOCUMENTS 6,145,650 A * 11/2000 Christ .................. B65G 47/525
198/493
6,152,289 A * 11/2000 Wark ................... B65G 47/525
198/460.1

* cited by examiner

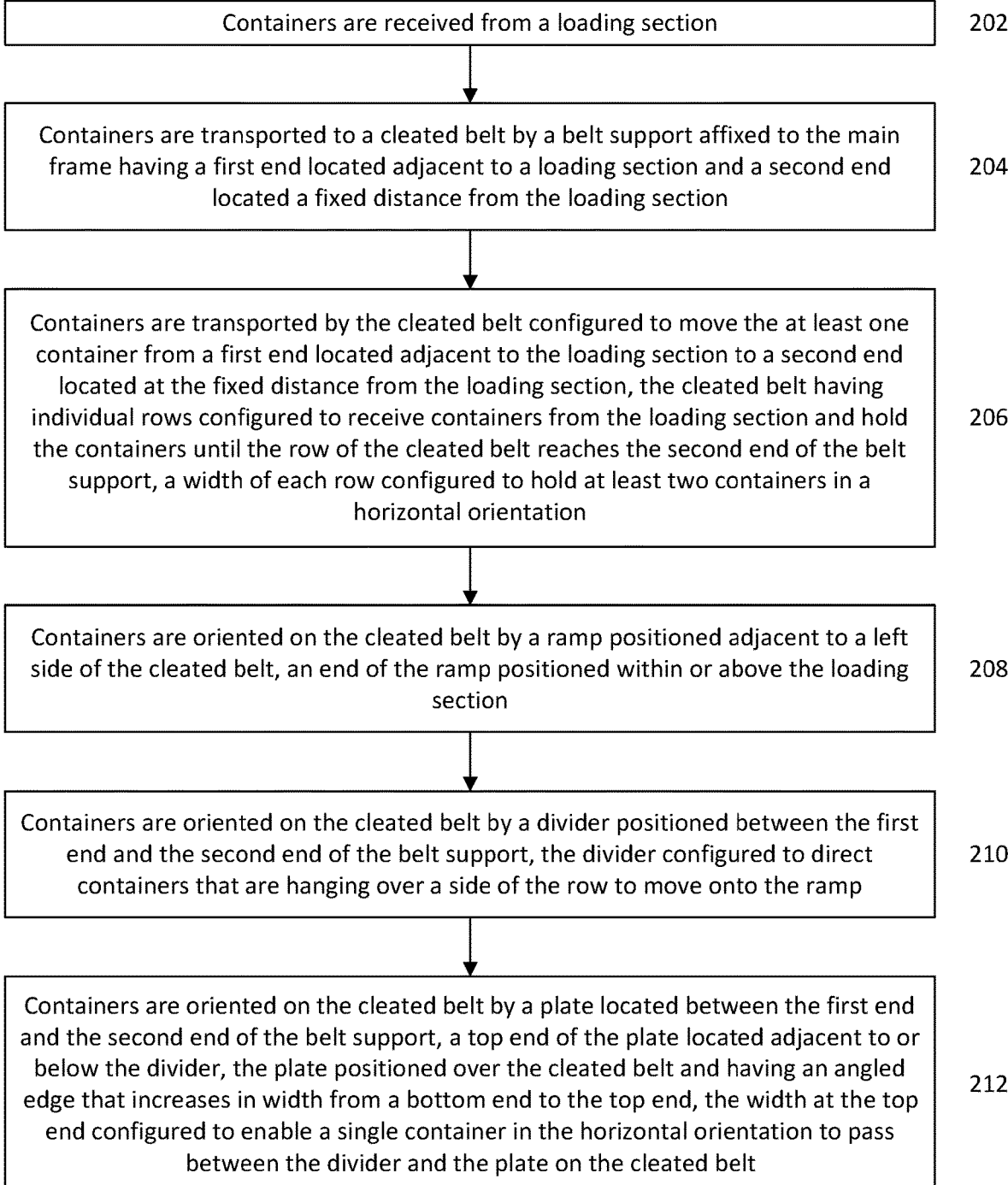

| Containers are received from a loading section | 202 |

| Containers are transported to a cleated belt by a belt support affixed to the main frame having a first end located adjacent to a loading section and a second end located a fixed distance from the loading section | 204 |

| Containers are transported by the cleated belt configured to move the at least one container from a first end located adjacent to the loading section to a second end located at the fixed distance from the loading section, the cleated belt having individual rows configured to receive containers from the loading section and hold the containers until the row of the cleated belt reaches the second end of the belt support, a width of each row configured to hold at least two containers in a horizontal orientation | 206 |

| Containers are oriented on the cleated belt by a ramp positioned adjacent to a left side of the cleated belt, an end of the ramp positioned within or above the loading section | 208 |

| Containers are oriented on the cleated belt by a divider positioned between the first end and the second end of the belt support, the divider configured to direct containers that are hanging over a side of the row to move onto the ramp | 210 |

| Containers are oriented on the cleated belt by a plate located between the first end and the second end of the belt support, a top end of the plate located adjacent to or below the divider, the plate positioned over the cleated belt and having an angled edge that increases in width from a bottom end to the top end, the width at the top end configured to enable a single container in the horizontal orientation to pass between the divider and the plate on the cleated belt | 212 |

Figure 12:
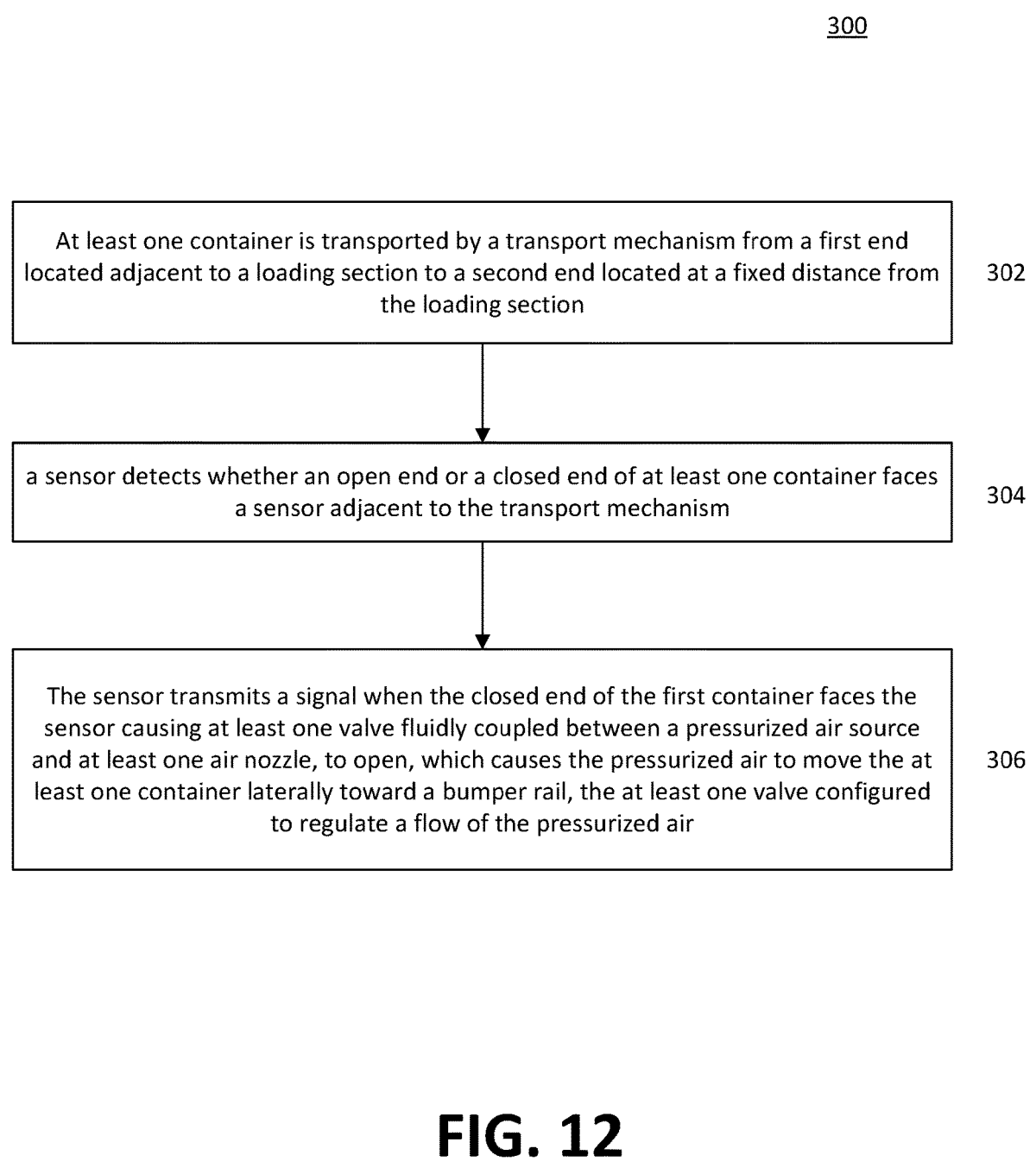

| At least one container is transported by a transport mechanism from a first end located adjacent to a loading section to a second end located at a fixed distance from the loading section | 302 |

| a sensor detects whether an open end or a closed end of at least one container faces a sensor adjacent to the transport mechanism | 304 |

| The sensor transmits a signal when the closed end of the first container faces the sensor causing at least one valve fluidly coupled between a pressurized air source and at least one air nozzle, to open, which causes the pressurized air to move the at least one container laterally toward a bumper rail, the at least one valve configured to regulate a flow of the pressurized air | 306 |

Figure 17:
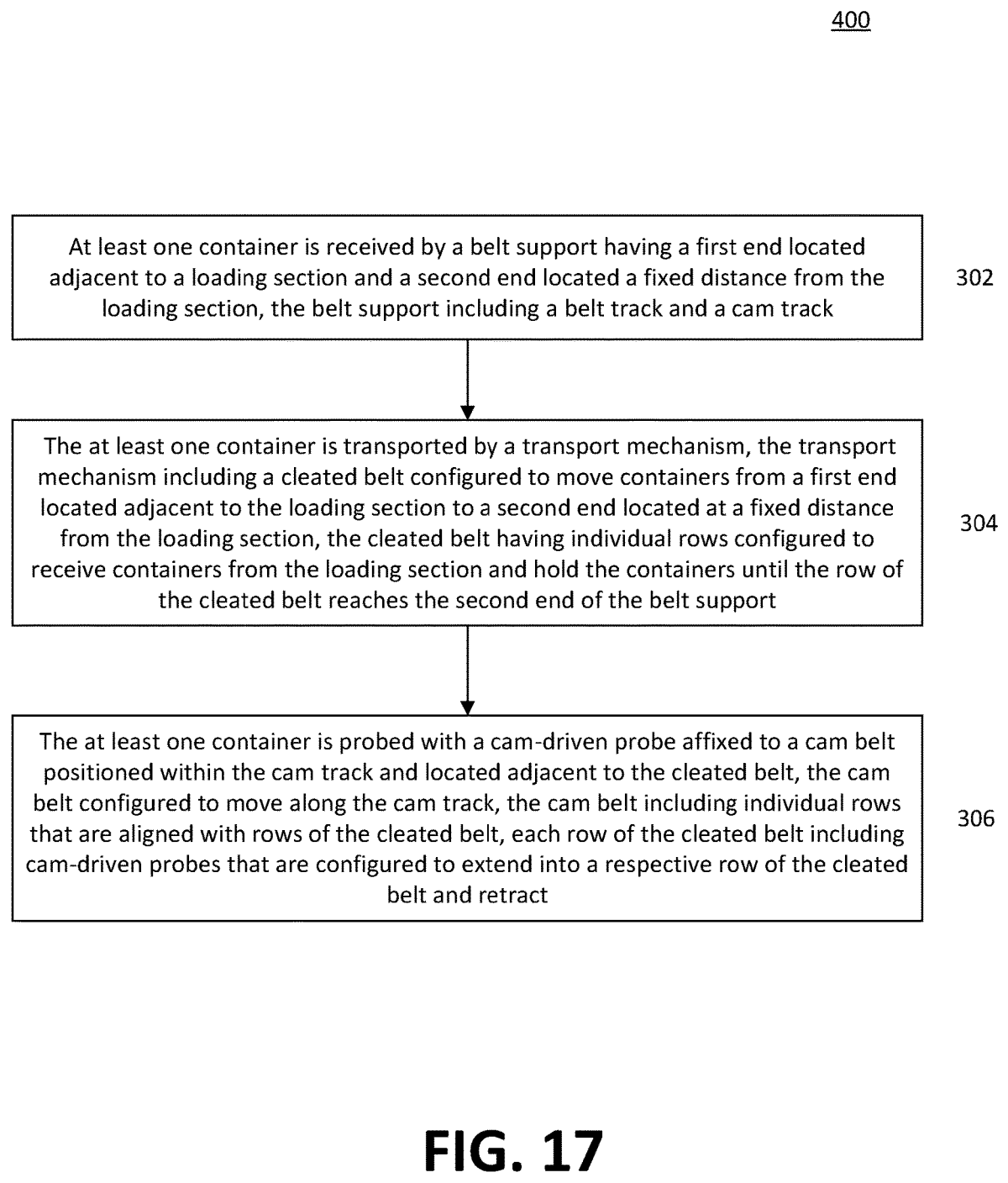

| At least one container is received by a belt support having a first end located adjacent to a loading section and a second end located a fixed distance from the loading section, the belt support including a belt track and a cam track | 302 |

| The at least one container is transported by a transport mechanism, the transport mechanism including a cleated belt configured to move containers from a first end located adjacent to the loading section to a second end located at a fixed distance from the loading section, the cleated belt having individual rows configured to receive containers from the loading section and hold the containers until the row of the cleated belt reaches the second end of the belt support | 304 |

| The at least one container is probed with a cam-driven probe affixed to a cam belt positioned within the cam track and located adjacent to the cleated belt, the cam belt configured to move along the cam track, the cam belt including individual rows that are aligned with rows of the cleated belt, each row of the cleated belt including cam-driven probes that are configured to extend into a respective row of the cleated belt and retract | 306 |

Figure 22:
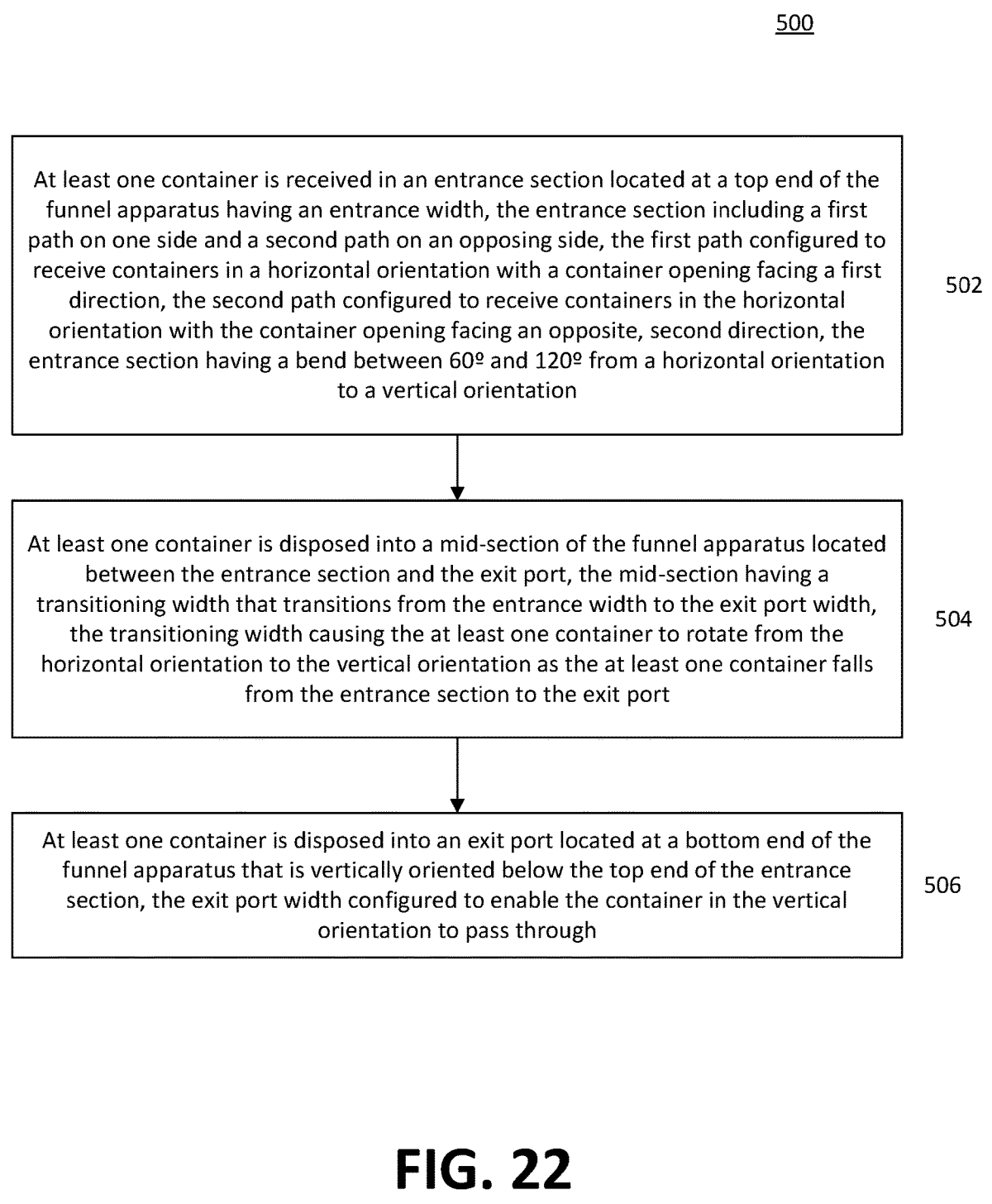

At least one container is received in an entrance section located at a top end of the funnel apparatus having an entrance width, the entrance section including a first path on one side and a second path on an opposing side, the first path configured to receive containers in a horizontal orientation with a container opening facing a first direction, the second path configured to receive containers in the horizontal orientation with the container opening facing an opposite, second direction, the entrance section having a bend between 60º and 120º from a horizontal orientation to a vertical orientation

502

At least one container is disposed into a mid-section of the funnel apparatus located between the entrance section and the exit port, the mid-section having a transitioning width that transitions from the entrance width to the exit port width, the transitioning width causing the at least one container to rotate from the horizontal orientation to the vertical orientation as the at least one container falls from the entrance section to the exit port

504

At least one container is disposed into an exit port located at a bottom end of the funnel apparatus that is vertically oriented below the top end of the entrance section, the exit port width configured to enable the container in the vertical orientation to pass through

Figure 26:
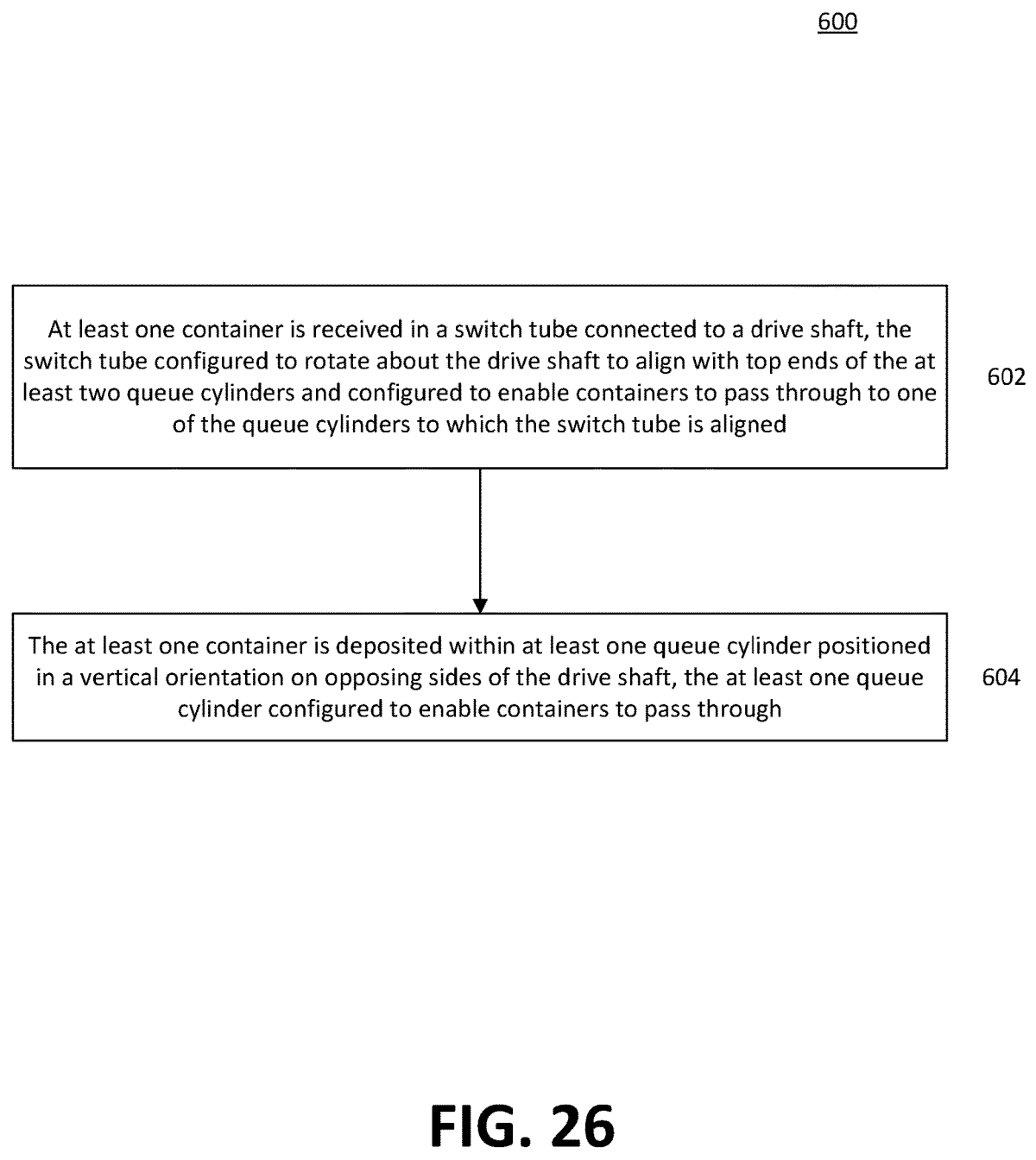

At least one container is received in a switch tube connected to a drive shaft, the switch tube configured to rotate about the drive shaft to align with top ends of the at least two queue cylinders and configured to enable containers to pass through to one of the queue cylinders to which the switch tube is aligned

602

The at least one container is deposited within at least one queue cylinder positioned in a vertical orientation on opposing sides of the drive shaft, the at least one queue cylinder configured to enable containers to pass through

MEDICATION CONTAINER AIR SORTING SYSTEM AND APPARATUS

PRIORITY CLAIM

This application claims priority to and the benefit of U.S. Provisional Patent Application Ser. No. 63/453,977, filed on Mar. 22, 2023, the entire disclosure of which is hereby incorporated by reference.

BACKGROUND

Typical prescription medication fulfillment systems process hundreds to thousands of prescriptions a day. These prescription medication fulfillment systems may be used for the online fulfillment of medication prescriptions in instances where patient-specific local pharmacy preparation is not needed. Additionally, some prescription medication fulfillment systems may use conveyance systems to at least help automate operations that may instead be performed a local pharmacy, such as prescription filling and packaging.

As the population continues to age and pharmaceutical companies continue to develop more medications for illnesses, it is inevitable that the distribution points for such medications must become more efficient. From local pharmacies to national drug store chains to large, mail order fulfillment centers that fill tens of millions of prescriptions annually, automation has greatly affected the speed, efficiency, and accuracy of prescription distribution.

It is not surprising that automation results in greater profitability for wholesale and retail pharmacy business owners. Reducing manual operations results in lower payrolls, fewer interruptions in workflow, and greater production predictability. In addition, much of the human error associated with manually filling prescriptions is eliminated. Therefore, reductions in manual operations and human operators creates more efficient and error-free prescription fulfillment operations.

With the development of highly accurate technological mechanisms, including sophisticated hardware and software control systems, there should be little need for human operators to perform some of the repetitive tasks still found in pharmacies. While advancing technology has been applied to large-scale vial filling operations, heretofore such techniques have not been combined with built-in prescription entry and verification features within small, stand-alone units suitable for use in small size pharmacies.

A need accordingly exists for an automated container orienting and sorter system that incorporates advancing technology therein to ensure fast and accurate operations.

Additionally, a need exists for an accurate and efficient machine to assist with medication fulfillment.

Further, a need exists for an automated container orienting and sorter system that is contained within small, stand-alone unis for use in small size pharmacies.

SUMMARY

Example systems, apparatus, and methods are disclosed herein for sorting and orienting medication containers. The disclosed systems, apparatus, and methods are intended to improve upon previously existing systems, apparatus, and methods for sorting and orienting medication containers. Specifically, as disclosed herein, the systems, apparatus, and methods solve common difficulties in the pharmacy automation process. In an example, the present disclosure is configured to transport medication containers from a hopper to a sorting funnel using an inclined conveyor belt. As disclosed herein, the conveyor belt includes features that ensure each cleat contains one medication container in a horizontal orientation. The features ensure the medication containers can be stacked without telescoping or otherwise pausing the conveyor belt and downstream conveyance systems. In another example, the systems, apparatus, and methods disclosed herein allow for increased efficiency as a high volume of medication containers can be sorted and oriented at once whereas some older systems sorted and oriented containers at a much slower pace.

In light of the disclosure herein and without limiting the disclosure in any way, in a first aspect of the present disclosure, which may be combined with any other aspect listed herein unless specified otherwise, a funnel apparatus includes an entrance section, an exit port, and a mid-section. The entrance section located at a top end of the funnel apparatus and has an entrance width. The entrance section also includes a first path on one side and a second path on an opposing side. The first path is configured to receive containers in a horizontal orientation with a container opening facing a first direction, and the second path configured to receive containers in the horizontal orientation with the container opening facing an opposite, second direction. The entrance section has a bend between 60° and 120° to change from a horizontal orientation to a vertical orientation. The exit port is located at a bottom end of the funnel apparatus that is vertically oriented below the top end of the entrance section. The exit port width is configured to enable the container in the vertical orientation to pass through. Finally, the mid-section of the funnel apparatus is located between the entrance section and the exit port. The mid-section has a transitioning width that transitions from the entrance width to the exit port width, and the transitioning width causes the container to rotate from the horizontal orientation to the vertical orientation as the container falls from the entrance section to the exit port.

In another aspect of the present disclosure, which may be combined with any other aspect listed herein unless specified otherwise, the funnel apparatus further includes a transport mechanism for transporting the containers to the entrance section.

In another aspect of the present disclosure, which may be combined with any other aspect listed herein unless specified otherwise, the transport mechanism is a cleated belt conveyor track.

In another aspect of the present disclosure, which may be combined with any other aspect listed herein unless specified otherwise, the funnel apparatus further includes a sensor configured to detect whether the container has successfully fallen through the exit port.

In another aspect of the present disclosure, which may be combined with any other aspect listed herein unless specified otherwise, the sensor is an optical sensor.

In another aspect of the present disclosure, which may be combined with any other aspect listed herein unless specified otherwise, the sensor is configured to communicate with a controller configured to control a transport mechanism configured to transport the containers to the entrance section.

In another aspect of the present disclosure, which may be combined with any other aspect listed herein unless specified otherwise, the funnel apparatus further includes a sensor configured to detect whether a container entering the entrance section is in a desired position.

In another aspect of the present disclosure, which may be combined with any other aspect listed herein unless specified otherwise, the sensor is an optical sensor.

In another aspect of the present disclosure, which may be combined with any other aspect listed herein unless specified otherwise, the sensor is configured to communicate with a controller configured to control a transport mechanism configured to transport the containers to the entrance section.

In another aspect of the present disclosure, which may be combined with any other aspect listed herein unless specified otherwise, the exit port has an exit port width that is less than the entrance width.

In another aspect of the present disclosure, which may be combined with any other aspect listed herein unless specified otherwise, a method for aggregating and sorting containers in a funnel apparatus includes a first step of at least one container being received in an entrance section located at a top end of the funnel apparatus having an entrance width, the entrance section including a first path on one side and a second path on an opposing side, the first path configured to receive containers in a horizontal orientation with a container opening facing a first direction, the second path configured to receive containers in the horizontal orientation with the container opening facing an opposite, second direction, the entrance section having a bend between 60° and 120° from a horizontal orientation to a vertical orientation. In a second step, at least one container is disposed into a mid-section of the funnel apparatus located between the entrance section and the exit port, the mid-section having a transitioning width that transitions from the entrance width to the exit port width, the transitioning width causing the at least one container to rotate from the horizontal orientation to the vertical orientation as the at least one container falls from the entrance section to the exit port. In a third step, at least one container is disposed into an exit port located at a bottom end of the funnel apparatus that is vertically oriented below the top end of the entrance section, the exit port width configured to enable the container in the vertical orientation to pass through.

In another aspect of the present disclosure, which may be combined with any other aspect listed herein unless specified otherwise, the funnel apparatus further includes a transport mechanism for transporting the containers to the entrance section.

In another aspect of the present disclosure, which may be combined with any other aspect listed herein unless specified otherwise, the transport mechanism is a cleated belt conveyor track.

In another aspect of the present disclosure, which may be combined with any other aspect listed herein unless specified otherwise, the funnel apparatus further includes a sensor configured to detect whether the container has successfully fallen through the exit port.

In another aspect of the present disclosure, which may be combined with any other aspect listed herein unless specified otherwise, the sensor is an optical sensor.

In another aspect of the present disclosure, which may be combined with any other aspect listed herein unless specified otherwise, the sensor is configured to communicate with a controller configured to control a transport mechanism configured to transport the containers to the entrance section.

In another aspect of the present disclosure, which may be combined with any other aspect listed herein unless specified otherwise, the funnel apparatus further includes a sensor configured to detect whether a container entering the entrance section is in a desired position.

In another aspect of the present disclosure, which may be combined with any other aspect listed herein unless specified otherwise, the sensor is an optical sensor.

In another aspect of the present disclosure, which may be combined with any other aspect listed herein unless specified otherwise, the sensor is configured to communicate with a controller configured to control a transport mechanism configured to transport the containers to the entrance section.

In another aspect of the present disclosure, which may be combined with any other aspect listed herein unless specified otherwise, the exit port has an exit port width that is less than the entrance width.

In another aspect of the present disclosure, which may be combined with any other aspect listed herein unless specified otherwise, a container queue apparatus includes a drive shaft, at least two queue cylinders, a switch tube, at least one stop actuator, and a hold actuator. The queue cylinders are positioned in a vertical orientation on opposing sides of the drive shaft, and each of the queue cylinders is configured to enable containers to pass through. The switch tube is connected to an end of the drive shaft and is configured to rotate about the drive shaft to align with top ends of the at least two queue cylinders and configured to enable containers to pass through to one of the queue cylinders to which the switch tube is aligned. Finally, the hold actuator is positioned above the stop actuator and configured to retain at least a second container from a bottom of the at least two queue cylinders when in a closed position.

In another aspect of the present disclosure, which may be combined with any other aspect listed herein unless specified otherwise, the drive shaft is provided in a vertical orientation.

In another aspect of the present disclosure, which may be combined with any other aspect listed herein unless specified otherwise, the at least two queue cylinders have a partial twist to prevent telescoping of the containers.

In another aspect of the present disclosure, which may be combined with any other aspect listed herein unless specified otherwise, the switch tube is helical.

In another aspect of the present disclosure, which may be combined with any other aspect listed herein unless specified otherwise, the switch tube receives the containers through an input end.

In another aspect of the present disclosure, which may be combined with any other aspect listed herein unless specified otherwise, the switch tube can be rotated from a first position to at least a second position by the drive shaft.

In another aspect of the present disclosure, which may be combined with any other aspect listed herein unless specified otherwise, the container queue apparatus further includes a platform to which the at least two queue cylinders, the switch tube, the stop actuator, and the hold actuator are mounted.

In another aspect of the present disclosure, which may be combined with any other aspect listed herein unless specified otherwise, the container queue apparatus includes a motor configured to operate the drive shaft.

In another aspect of the present disclosure, which may be combined with any other aspect listed herein unless specified otherwise, the container queue apparatus includes a hold actuator for each of the at least two queue cylinders.

In another aspect of the present disclosure, which may be combined with any other aspect listed herein unless specified otherwise, the container queue apparatus includes a sensor configured to determine when one of the at least two queue cylinders are full.

In another aspect of the present disclosure, which may be combined with any other aspect listed herein unless specified otherwise, the sensor is an optical sensor.

In another aspect of the present disclosure, which may be combined with any other aspect listed herein unless specified otherwise, the container queue apparatus includes a lid mounted to a bottom end of the switch tube configured to cover the top ends of the at least two queue cylinders not aligned with the switch tube.

In another aspect of the present disclosure, which may be combined with any other aspect listed herein unless specified otherwise, the at least one stop actuator is positioned adjacent to a bottom end of the respective queue cylinder and configured to release a container located at the bottom of the at least two queue cylinders when in an open position for each of the at least two queue cylinders.

In another aspect of the present disclosure, which may be combined with any other aspect listed herein unless specified otherwise, a method for aggregating and sorting containers in a container queue apparatus includes a first step of at least one container being received in a switch tube connected to a drive shaft, the switch tube configured to rotate about the drive shaft to align with top ends of the at least two queue cylinders and configured to enable containers to pass through to one of the queue cylinders to which the switch tube is aligned. In a second step, the at least one container is deposited within at least one queue cylinder positioned in a vertical orientation on opposing sides of the drive shaft, the at least one queue cylinder configured to enable containers to pass through.

In another aspect of the present disclosure, which may be combined with any other aspect listed herein unless specified otherwise, the method further includes holding the at least one container within the at least one queue cylinder when a hold actuator is in a closed position.

In another aspect of the present disclosure, which may be combined with any other aspect listed herein unless specified otherwise, the drive shaft is provided in a vertical orientation.

In another aspect of the present disclosure, which may be combined with any other aspect listed herein unless specified otherwise, the at least two queue cylinders have a partial twist to prevent telescoping of the containers.

In another aspect of the present disclosure, which may be combined with any other aspect listed herein unless specified otherwise, the switch tube can be rotated from a first position to at least a second position by the drive shaft.

In another aspect of the present disclosure, which may be combined with any other aspect listed herein unless specified otherwise, the container queue apparatus further includes a sensor configured to determine when the at least one queue cylinder is full.

In another aspect of the present disclosure, which may be combined with any other aspect listed herein unless specified otherwise, the container queue apparatus further includes at least one stop actuator is positioned adjacent to a bottom end of the respective queue cylinder and configured to release a container located at the bottom of the at least two queue cylinders when in an open position.

In another aspect of the present disclosure, which may be combined with any other aspect listed herein unless specified otherwise, a container sorting apparatus includes a transport mechanism, a bumper rail, at least one air nozzle, at least one valve, and a sensor. The transport mechanism is configured to transport containers from a first end located adjacent to a loading section to a second end located at a fixed distance from the loading section. The bumper rail is located adjacent to a first side of the transport mechanism. The at least one air nozzle is located adjacent to an opposite, second side of the transport mechanism across from a portion of the bumper rail. The at least one air nozzle is connected to a pressurized air source and configured to blow pressurized air toward the bumper rail. The at least one valve is fluidly coupled between the pressurized air source and the at least one air nozzle and is configured to regulate a flow of the pressurized air. The sensor is configured to detect whether an open end or a closed end of a first container faces the sensor and transmit a signal when the closed end of the first container faces the sensor causing the at least one valve to open, which causes the pressurized air to move the first container laterally toward the bumper rail.

In another aspect of the present disclosure, which may be combined with any other aspect listed herein unless specified otherwise, the transport mechanism is configured to transport the containers past the at least one air nozzle.

In another aspect of the present disclosure, which may be combined with any other aspect listed herein unless specified otherwise, the second end of the transport mechanism is located at a higher elevation than the first end.

In another aspect of the present disclosure, which may be combined with any other aspect listed herein unless specified otherwise, the transport mechanism is a cleated belt positioned along an incline. The cleated belt defines rows to hold containers in a horizontal orientation and is configured to receive containers at the loading section located at a lower end of the incline and dispense the containers at a dispense section located at an upper end of the incline.

In another aspect of the present disclosure, which may be combined with any other aspect listed herein unless specified otherwise, the at least one air nozzle is oriented to release pressurized air perpendicularly to the cleated belt.

In another aspect of the present disclosure, which may be combined with any other aspect listed herein unless specified otherwise, the sensor is an optical sensor.

In another aspect of the present disclosure, which may be combined with any other aspect listed herein unless specified otherwise, the sensor is a micro switch.

In another aspect of the present disclosure, which may be combined with any other aspect listed herein unless specified otherwise, the container sorting apparatus includes a main frame to which the transport mechanism is mounted.

In another aspect of the present disclosure, which may be combined with any other aspect listed herein unless specified otherwise, the container sorting apparatus includes a valve manifold to contain the at least one valve.

In another aspect of the present disclosure, which may be combined with any other aspect listed herein unless specified otherwise, the at least one air nozzle is coupled to more than one valve.

In another aspect of the present disclosure, which may be combined with any other aspect listed herein unless specified otherwise, a method for aggregating and sorting containers in a container sorter apparatus includes a first step where at least one container is transported by a transport mechanism from a first end located adjacent to a loading section to a second end located at a fixed distance from the loading section. In a second step, a sensor detects whether an open end or a closed end of at least one container faces a sensor adjacent to the transport mechanism. In a third step, the sensor transmits a signal when the closed end of the first container faces the sensor causing at least one valve fluidly coupled between a pressurized air source and at least one air nozzle, to open, which causes the pressurized air to move the at least one container laterally toward a bumper rail, the at least one valve configured to regulate a flow of the pressurized air.

In another aspect of the present disclosure, which may be combined with any other aspect listed herein unless specified otherwise, the transport mechanism is configured to transport the containers past the at least one air nozzle.

In another aspect of the present disclosure, which may be combined with any other aspect listed herein unless specified otherwise, the second end of the transport mechanism is located at a higher elevation than the first end.

In another aspect of the present disclosure, which may be combined with any other aspect listed herein unless specified otherwise, the transport mechanism is a cleated belt positioned along an incline. The cleated belt defines rows to hold containers in a horizontal orientation and is configured to receive containers at the loading section located at a lower end of the incline and dispense the containers at a dispense section located at an upper end of the incline.

In another aspect of the present disclosure, which may be combined with any other aspect listed herein unless specified otherwise, the at least one air nozzle is oriented to release pressurized air perpendicularly to the cleated belt.

In another aspect of the present disclosure, which may be combined with any other aspect listed herein unless specified otherwise, the sensor is an optical sensor.

In another aspect of the present disclosure, which may be combined with any other aspect listed herein unless specified otherwise, the sensor is a micro switch.

In another aspect of the present disclosure, which may be combined with any other aspect listed herein unless specified otherwise, the container sorting apparatus includes a main frame to which the transport mechanism is mounted.

In another aspect of the present disclosure, which may be combined with any other aspect listed herein unless specified otherwise, the container sorting apparatus includes a valve manifold to contain the at least one valve.

In another aspect of the present disclosure, which may be combined with any other aspect listed herein unless specified otherwise, the at least one air nozzle is coupled to more than one valve.

In another aspect of the present disclosure, which may be combined with any other aspect listed herein unless specified otherwise, a container singulator apparatus includes a main frame, a belt support, a cleated belt, a ramp, a divider, and a push plate. The belt support is affixed to the main frame and has a first end located adjacent to a loading section and a second end located a fixed distance from the loading section. The cleated belt is configured to move containers from a first end located adjacent to the loading section to a second end located at the fixed distance from the loading section. The cleated belt has individual rows configured to receive containers from the loading section and hold the containers until the row of the cleated belt reaches the second end of the belt support. The width of each row is configured to hold at least two containers in a horizontal orientation. The ramp is positioned adjacent to a left side of the cleated belt and the end of the ramp is positioned within or above the loading section. The divider is positioned between the first end and the second end of the belt support. The divider is configured to direct containers that are hanging over a side of the row to the ramp. Finally, the plate is located between the first end and the second end of the belt support. The top end of the plate is located adjacent to or below the divider. The plate is positioned over the cleated belt and has an angled edge that increases in width from a bottom end to the top end with the width at the top end configured to enable a single container in the horizontal orientation to pass between the divider and the plate on the cleated belt.

In another aspect of the present disclosure, which may be combined with any other aspect listed herein unless specified otherwise, the second end of the belt support is located at a higher elevation than the first end.

In another aspect of the present disclosure, which may be combined with any other aspect listed herein unless specified otherwise, the cleated belt is configured to dispense the containers at a dispense section located at the second end of the cleated belt.

In another aspect of the present disclosure, which may be combined with any other aspect listed herein unless specified otherwise, the cleated belt forms an elevator.

In another aspect of the present disclosure, which may be combined with any other aspect listed herein unless specified otherwise, the divider is configured to direct containers oriented in a vertical orientation off of the cleated belt.

In another aspect of the present disclosure, which may be combined with any other aspect listed herein unless specified otherwise, the divider is affixed to the ramp.

In another aspect of the present disclosure, which may be combined with any other aspect listed herein unless specified otherwise, the divider is affixed to the plate.

In another aspect of the present disclosure, which may be combined with any other aspect listed herein unless specified otherwise, the container singulator apparatus includes a guiding plate affixed to the belt support configured to guide the containers pushed off of the cleated belt to the loading section.

In another aspect of the present disclosure, which may be combined with any other aspect listed herein unless specified otherwise, the guiding plate is curved.

In another aspect of the present disclosure, which may be combined with any other aspect listed herein unless specified otherwise, the cleated belt receives the containers from the loading section.

In another aspect of the present disclosure, which may be combined with any other aspect listed herein unless specified otherwise, a method for aggregating and sorting containers in a container singulator apparatus includes a first step where containers are received from a loading section. In a second step, the containers are transported to a cleated belt by a belt support affixed to the main frame having a first end located adjacent to a loading section and a second end located a fixed distance from the loading section. In a third step, the containers are transported by the cleated belt configured to move the at least one container from a first end located adjacent to the loading section to a second end located at the fixed distance from the loading section, the cleated belt having individual rows configured to receive containers from the loading section and hold the containers until the row of the cleated belt reaches the second end of the belt support, a width of each row configured to hold at least two containers in a horizontal orientation. In a fourth step, the containers are oriented on the cleated belt by a ramp positioned adjacent to a left side of the cleated belt, an end of the ramp positioned within or above the loading section. In a fifth step, the containers are oriented on the cleated belt by a divider positioned between the first end and the second end of the belt support, the divider configured to direct containers that are hanging over a side of the row to move onto the ramp. In a sixth step, the containers are oriented on the cleated belt by a plate located between the first end and the second end of the belt support, a top end of the plate located adjacent to or below the divider, the plate positioned over the cleated belt and having an angled edge that increases in width from a bottom end to the top end, the width at the top end configured to enable a single container in the horizontal orientation to pass between the divider and the plate on the cleated belt.

In another aspect of the present disclosure, which may be combined with any other aspect listed herein unless specified otherwise, the second end of the belt support is located at a higher elevation than the first end.

In another aspect of the present disclosure, which may be combined with any other aspect listed herein unless specified otherwise, the cleated belt is configured to dispense the containers at a dispense section located at the second end of the cleated belt.

In another aspect of the present disclosure, which may be combined with any other aspect listed herein unless specified otherwise, the cleated belt forms an elevator.

In another aspect of the present disclosure, which may be combined with any other aspect listed herein unless specified otherwise, the divider is configured to direct containers oriented in a vertical orientation off of the cleated belt.

In another aspect of the present disclosure, which may be combined with any other aspect listed herein unless specified otherwise, the divider is affixed to the ramp.

In another aspect of the present disclosure, which may be combined with any other aspect listed herein unless specified otherwise, the divider is affixed to the plate.

In another aspect of the present disclosure, which may be combined with any other aspect listed herein unless specified otherwise, the container singulator apparatus includes a guiding plate affixed to the belt support configured to guide the containers pushed off of the cleated belt to the loading section.

In another aspect of the present disclosure, which may be combined with any other aspect listed herein unless specified otherwise, the guiding plate is curved.

In another aspect of the present disclosure, which may be combined with any other aspect listed herein unless specified otherwise, the cleated belt receives the containers from the loading section.

In another aspect of the present disclosure, which may be combined with any other aspect listed herein unless specified otherwise, the container sorting apparatus includes a belt support, a transport mechanism, a cleated belt, and a cam belt. The belt support has a first end located adjacent to a loading section and a second end located a fixed distance from the loading section and the belt support includes a belt track and a cam track. The transport mechanism is configured to transport containers. The cleated belt is configured to move containers from a first end located adjacent to the loading section to a second end located at a fixed distance from the loading section. The cleated belt has individual rows configured to receive containers from the loading section and hold the containers until the row of the cleated belt reaches the second end of the belt support. Additionally, the cam belt is positioned within the cam track and located adjacent to the cleated belt and is configured to move along the cam track. The cam belt includes individual rows that are aligned with rows of the cleated belt and each row of the cleated belt includes cam-driven probes that are configured to extend into a respective row of the cleated belt and retract.

In another aspect of the present disclosure, which may be combined with any other aspect listed herein unless specified otherwise, the second end of the belt support located at a higher elevation than the first end.

In another aspect of the present disclosure, which may be combined with any other aspect listed herein unless specified otherwise, the cam belt is configured to transport the containers past the cam-driven probes.

In another aspect of the present disclosure, which may be combined with any other aspect listed herein unless specified otherwise, the cleated belt is configured to dispense the containers at a dispense section located at an upper end of the cleated belt.

In another aspect of the present disclosure, which may be combined with any other aspect listed herein unless specified otherwise, the cam-driven probes are oriented to extend perpendicularly into the containers.

In another aspect of the present disclosure, which may be combined with any other aspect listed herein unless specified otherwise, the container sorting apparatus includes a motor configured to move the transport mechanism and the cam track.

In another aspect of the present disclosure, which may be combined with any other aspect listed herein unless specified otherwise, the cam-driven probes further include pivot arms.

In another aspect of the present disclosure, which may be combined with any other aspect listed herein unless specified otherwise, the cam track is contained within a face cam.

In another aspect of the present disclosure, which may be combined with any other aspect listed herein unless specified otherwise, the cam track includes a v-shaped path.

In another aspect of the present disclosure, which may be combined with any other aspect listed herein unless specified otherwise, the cam-driven probes include a block affixed to the cam belt, a sleeve affixed to the block, and a rod contained by the sleeve affixed to a roller configured to travel the cam track.

In another aspect of the present disclosure, which may be combined with any other aspect listed herein unless specified otherwise, a method for aggregating and sorting containers in a container sorting apparatus includes at least one container is received by a belt support having a first end located adjacent to a loading section and a second end located a fixed distance from the loading section, the belt support including a belt track and a cam track. In a second step, the at least one container is transported by a transport mechanism, the transport mechanism including a cleated belt configured to move containers from a first end located adjacent to the loading section to a second end located at a fixed distance from the loading section, the cleated belt having individual rows configured to receive containers from the loading section and hold the containers until the row of the cleated belt reaches the second end of the belt support. In a third step, the at least one container is probed with a cam-driven probe affixed to a cam belt positioned within the cam track and located adjacent to the cleated belt, the cam belt configured to move along the cam track, the cam belt including individual rows that are aligned with rows of the cleated belt, each row of the cleated belt including cam-driven probes that are configured to extend into a respective row of the cleated belt and retract.

In another aspect of the present disclosure, which may be combined with any other aspect listed herein unless specified otherwise, the second end of the belt support located at a higher elevation than the first end.

In another aspect of the present disclosure, which may be combined with any other aspect listed herein unless specified otherwise, the cam belt is configured to transport the containers past the cam-driven probes.

In another aspect of the present disclosure, which may be combined with any other aspect listed herein unless specified otherwise, the cleated belt is configured to dispense the containers at a dispense section located at an upper end of the cleated belt.

In another aspect of the present disclosure, which may be combined with any other aspect listed herein unless specified otherwise, the cam-driven probes are oriented to extend perpendicularly into the containers.

In another aspect of the present disclosure, which may be combined with any other aspect listed herein unless specified otherwise, the container sorting apparatus includes a motor configured to move the transport mechanism and the cam track.

In another aspect of the present disclosure, which may be combined with any other aspect listed herein unless specified otherwise, the cam-driven probes further include pivot arms.

In another aspect of the present disclosure, which may be combined with any other aspect listed herein unless specified otherwise, the cam track is contained within a face cam.

In another aspect of the present disclosure, which may be combined with any other aspect listed herein unless specified otherwise, the cam track includes a v-shaped path.

In another aspect of the present disclosure, which may be combined with any other aspect listed herein unless specified otherwise, the cam-driven probes include a block affixed to the cam belt, a sleeve affixed to the block, and a rod contained by the sleeve affixed to a roller configured to travel the cam track.

In another aspect of the present disclosure, any of the structure, functionality, and alternatives disclosed in connection with any one or more of FIGS. 1 to 21 may be combined with any other structure, functionality, and alternatives disclosed in connection with any other one or more of FIGS. 1 to 26.

In light of the present disclosure and the above aspects, it is therefore an advantage of the present disclosure to provide a machine that orients and sorts containers to facilitate ease of medication filling.

It is another advantage of the present disclosure to incorporate advancing technology to ensure fast and accurate operations.

A further advantage of the present disclosure to provide an accurate and efficient machine to assist with medication fulfillment.

It is yet another advantage to provide an automated container orienting and sorter system that is contained within small, stand-alone unis for use in small size pharmacies.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. In addition, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE FIGURES

FIG. 7 illustrates a method for aggregating and sorting containers in a container singulator apparatus, according to an example embodiment of the present disclosure.

FIG. 12 illustrates a method for aggregating and sorting containers in an air sort station, according to an example embodiment of the present disclosure.

FIG. 17 illustrates a method for aggregating and sorting containers in a mechanical probe sort station, according to an example embodiment of the present disclosure.

FIG. 22 illustrates a method for aggregating and sorting containers in an orientation funnel, according to an example embodiment of the present disclosure.

FIG. 26 illustrates a method for aggregating and sorting containers in a container queue apparatus, according to an example embodiment of the present disclosure.

DETAILED DESCRIPTION

Figure 1:
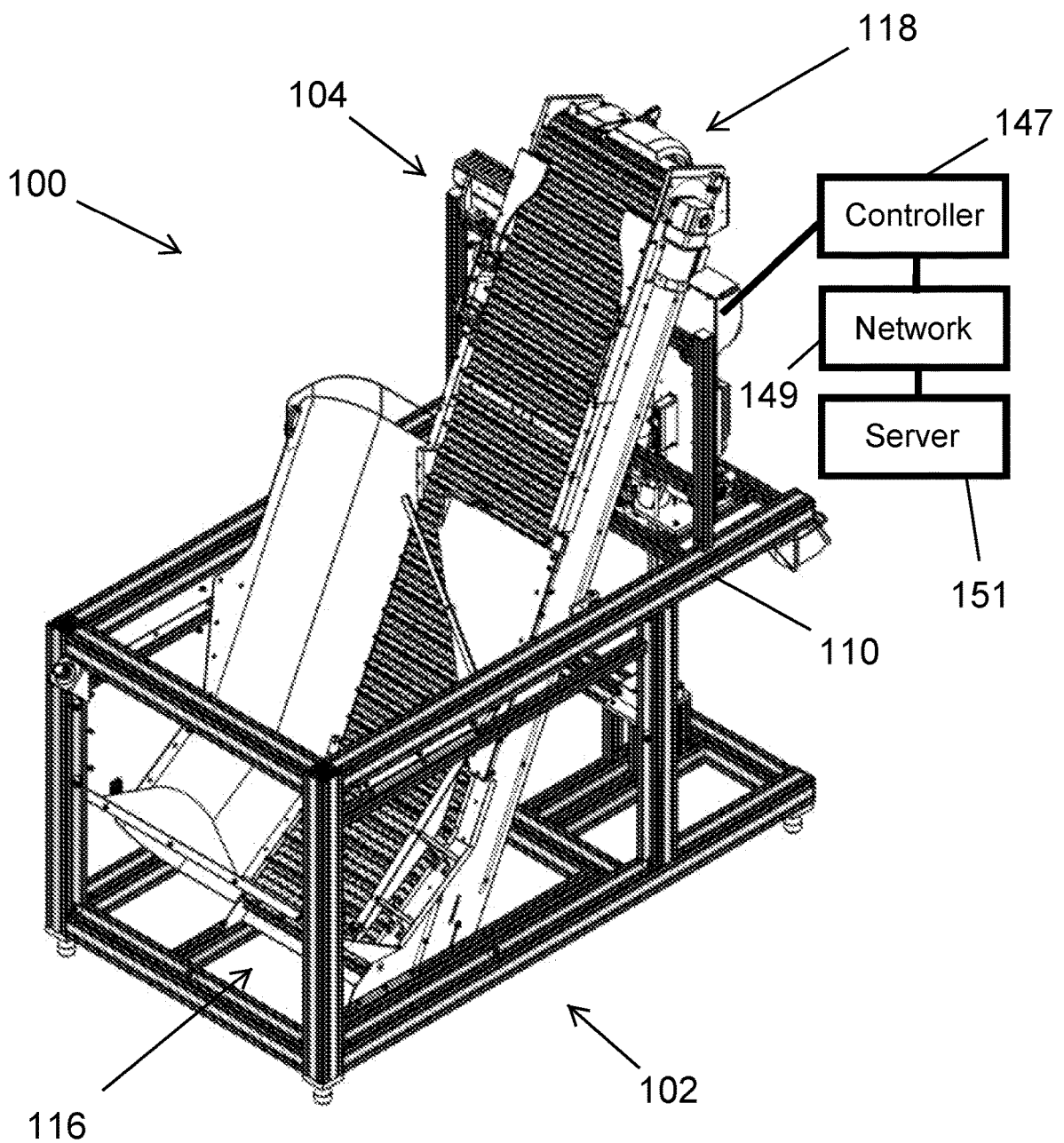
FIG. 1 shows an isometric front view of a container orienting and sorting system, according to an example embodiment of the present disclosure.

Systems, apparatus, and methods are disclosed herein for sorting and orienting medication containers. Non-limiting embodiments of the present disclosure are described by way of example with reference to the accompanying figures.

Reference is made herein to medication containers. Medication containers include a variety of containers such as medication bottles, vial carriers, pill packs, blister cards, or other containers for housing and moving medication. The medication held within the medication container may include pills, tablets, or other solid pharmaceutical drug dosage that is consumed by a patient. A medication may also include a compounded pharmaceutical that is prepared from two or more substances. A medication container may include a cylindrical container or a package for housing medication. The medication container described in this application is cylindrical in shape with an open end and a closed end in a vial shape. The open end may couple to a lid to ensure the medication within is secured and not able to be contaminated by exposure to any outside elements. Reference to containers within this application assumes that the lid has not been affixed to the container unless stated otherwise.

Though the present disclosure refers to containers used for packaging medication, it should be appreciated that the described invention may be operable with other articles. For example, the systems, apparatus, and methods may provide for the routing of packages in a facility, products to be packaged in a facility, and/or components to be assembled into a product along an assembly line.

Previously disclosed systems, apparatus, and methods for sorting and orienting medication containers are often less efficient that then present disclosure. The present disclosure provides a wide range of sorting and orienting tasks, as the present disclosure can take a collection of unsorted medication containers, transport and sort the medication containers, and dispense individual medication containers that are consistently oriented. In the prior art, several of these steps may have previously required human intervention which may have caused assembly lines to slow.

One specific application that often requires human intervention is the telescoping of medication containers. Telescoping occurs when one container enters into another and the two containers become stuck to one another, rendering at least one container unusable. Telescoped containers may cause stoppages in the process as the telescoped containers may be too large to fit into certain components within the system, or be unable to be detected by various sensors. As a result, telescoped containers would previously have to be pulled from the assembly line by a human operator.

The present disclosure prevents the telescoping of containers by using one or more features that ensure each row of an inclined conveyor belt contains a medication container in a horizontal orientation. The present disclosure also prevents telescoping using a partitioned funnel at an end of the conveyor belt that leads to one or more angled or curved queue cylinders. The present disclosure disclosed herein accordingly enables disorganized medication containers placed in a hopper to be placed into a proper orientation for subsequent processing while minimizing opportunities for jamming and telescoping.

Container Orienting and Sorting System Embodiment

Figure 2:
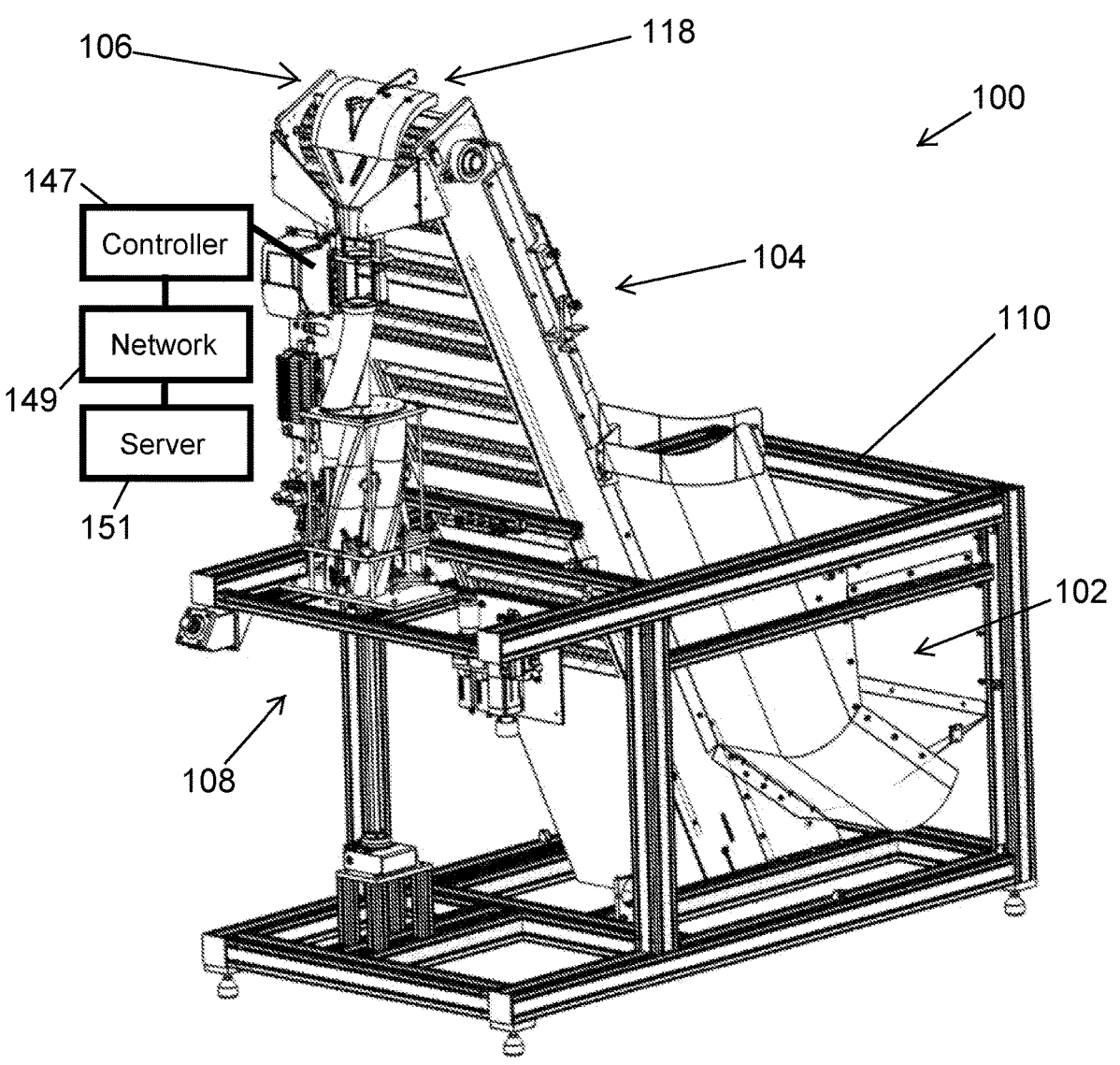
FIG. 2 shows an isometric rear view of the container orienting and sorting system of FIG. 1, according to an example embodiment of the present disclosure.
Figure 3:
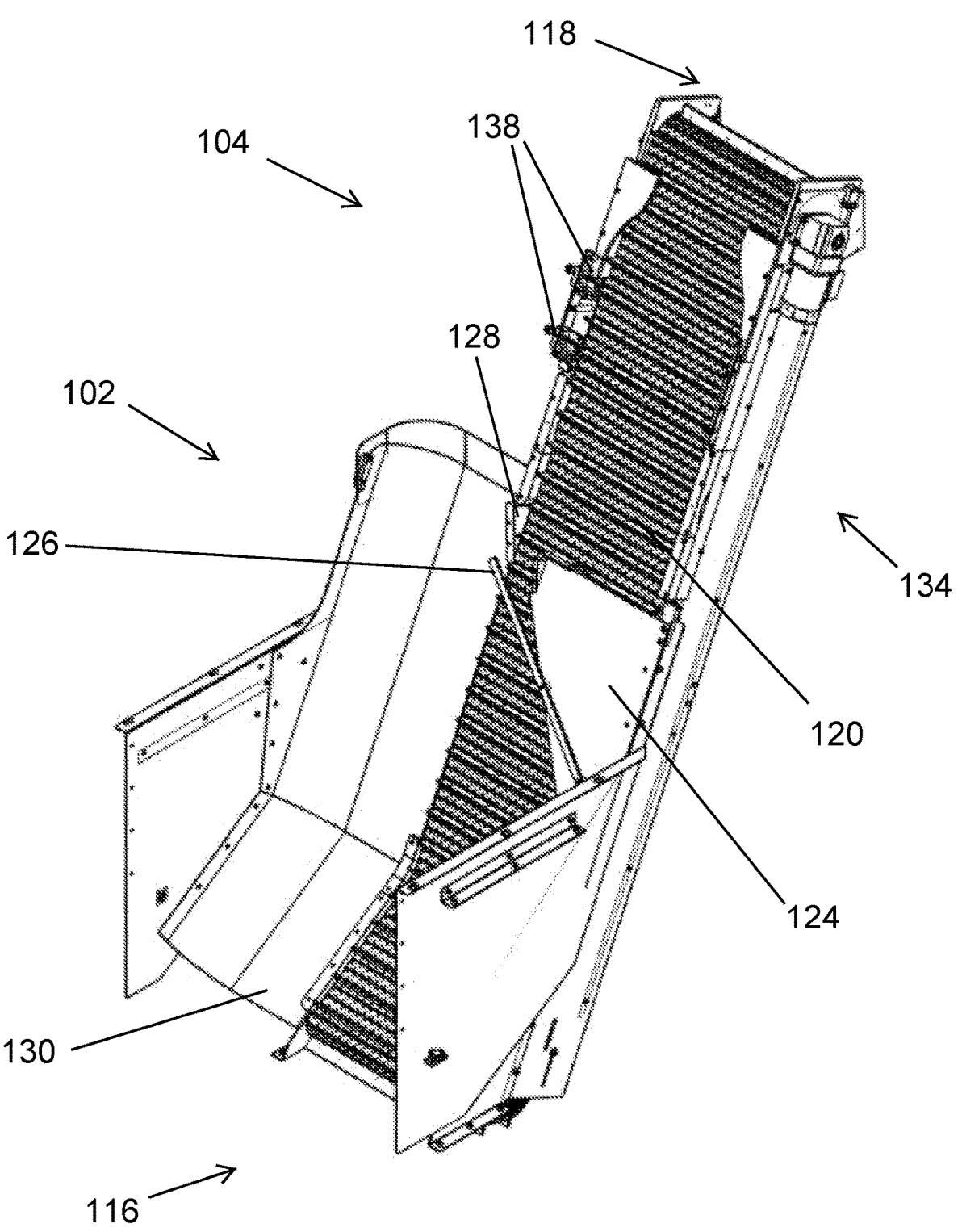
FIG. 3 shows an isometric front right view of a container singulator apparatus that is part of the container orienting and sorting system of FIG. 1, according to an example embodiment of the present disclosure.
Figure 4:
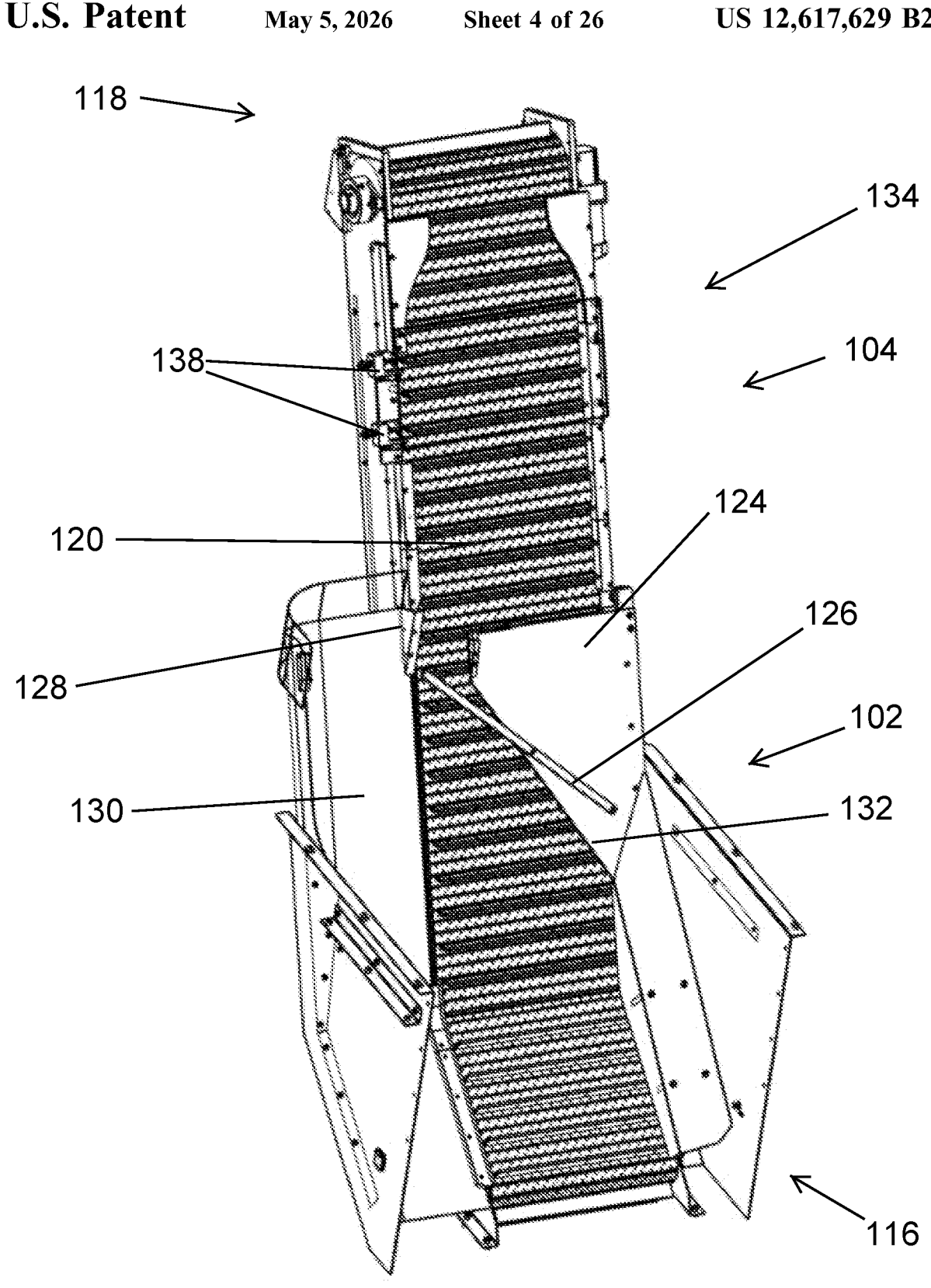
FIG. 4 shows an isometric front left view of the container singulator apparatus of FIG. 3, according to an example embodiment of the present disclosure.

Referring now to FIGS. 1 and 2, a container orienting and sorting system 100 includes a container singulator apparatus 102, a container sorting apparatus 104, an orientation funnel 106, and a container queue apparatus 108. Each of the container singulator apparatus 102, the container sorting apparatus 104, the orientation funnel 106, and the container queue apparatus 108 may operate contemporaneously. It should be appreciated that the container orienting and sorting system 100 has been simplified to make the description of the present disclosure simpler, and that the container orienting and sorting system 100, if implemented, may have additional structure and functionality.

Depending on the embodiment, the container singulator apparatus 102, the container sorting apparatus 104, the orientation funnel 106, the container queue apparatus 108, and other components of the container orienting and sorting system 100 may all be physically connected by framing, may be partially connected by framing, or may be physically separated. Additionally, the framing can integrate drawer slides so that the individual components within the container orienting and sorting system 100 can be accessed.

In the illustrated embodiment, a main frame 110 connects the container singulator apparatus 102, the container sorting apparatus 104, the orientation funnel 106, and the container queue apparatus 108. The main frame 110 may consist of metal framing, though it should be appreciated that the main frame 110 may consist of any material appropriate to support the components within the container orienting and sorting system 100. In some embodiments, the main frame 110 may have support structures such as supporting frames like a belt support frame or platforms to support other components within the container orienting and sorting system 100. In yet other embodiments beyond those illustrated, the main frame 110 can be supported by wheels so that the container orienting and sorting system 100 can be easily moved and re-arranged.

In other embodiments, movers such as pneumatic cylinders may be affixed to the main frame 110 to move containers 114 past the container queue apparatus 108 and to further loading and preparing stations. In embodiments with movers, components powering the movers such as motors, actuators, or blowers may be affixed to the main frame 110.

In some embodiments, the container orienting and sorting system 100 is controlled by a controller 147 that communicates with a network 149 and a server 151. The controller 147 includes an interface for receiving data and instructions from components such as sensors 144, receiving updates to said instructions, and implementing new instructions. The controller 147 is configured to actuate various components within the container orienting and sorting system 100, which may include motors, pneumatic slides, conveyors, gantries, or valves. For example, in the air sort station embodiment of the container sorting apparatus 104, the controller 147 is communicatively coupled to a flow control 142 and a valve 143 that is connected to an air nozzle 138. The controller 147 may be a programmable logic controller or a microcontroller. The controller 147 also may be local within the container orienting and sorting system 100. In other embodiments, the controller 147 is part of a process control system that remotely communicates with the container orienting and sorting system 100.

The controller 147 is communicatively coupled to the network 149 (e.g., a wide area network, a local area network, a controller area network, a wireless local area network, Ethernet, the Internet, a cellular network, a serial connection such as RS 232 or RS 485, Open Platform Communications ("OPC"), IO-Links, a hardwire connection, or combinations thereof). In the illustrated example, the controller 147 communicates with at least the sensor 144 via the network 149.

The network 149 is communicatively coupled to a server 151, which may include a database of control instructions stored on a memory device. The memory device of the server 151 stores machine-readable instructions, which when executed, cause the server 151 to perform the operations disclosed herein. The memory device may include any random access memory ("RAM"), read only memory ("ROM"), flash memory, magnetic or optical disks, optical memory, or other storage media. The memory device may also be configured to store instructions for controller 147 operations.

In some embodiments, the memory device may store movement instructions regarding the routing of containers 114 in a database. In these embodiments, the server 151 uses an interface to communicate with the controller 147 for the container singulator apparatus 102, the container sorting apparatus 104, the orientation funnel 106, and/or the container queue apparatus 108, as described further below.

Container Singulator Apparatus Embodiment

FIGS. 3-6 illustrate a container singulator apparatus 102 affixed to the main frame 110, according to an example embodiment of the present disclosure. The container singulator apparatus 102 is configured to retrieve containers 114 (see FIG. 13) from the loading section 116 and orient and singulate containers 114 so that only one container 114 is oriented in a horizontal direction on each cleat 122 of the cleated belt. The loading section 116 may be placed in (or adjacent to) a hopper that receives medication containers. With the hopper, the medication containers 114 may be disorganized since the containers 114 are typically emptied from a shipping container. The container singulator apparatus 102 includes a transport mechanism (e.g., a cleated belt conveyor track 120), a push plate 124, a divider 126, and a ramp 128. In some embodiments, the container singulator apparatus 102 may also include a guide plate 130.

Affixed to the main frame 110 is a transport mechanism. The transport mechanism is configured to receive medication containers 114 from the loading section 116. The transport mechanism is configured to receive more than one container 114 contemporaneously. The containers 114 may be fed into transport mechanism from the loading section via a belt support having a first end located adjacent to a loading section and a second end located a fixed distance from the loading section, the belt support including a belt track and a cam track. In other embodiments, the containers 114 may be fed into the transport mechanism from the loading section 116 in a variety of manners, including but not limited to, manually feeding, conveying by conveyor belt or dial machine indexer, or rolling the medication containers 114 down ramps. In other embodiments, the containers 114 may be received directly by the transport mechanism itself.

The transport mechanism and other moveable components in the container orienting and sorting system 100 are powered by a motor or other related actuator. It should be appreciated that the motor identified within the application is purely exemplary and that other motors or actuators may be added or omitted in other embodiments of the container orienting and sorting system 100.

The transport mechanism may be any mechanism capable of moving the containers 114 from a first end by the loading section 116 to a second end located at a fixed distance from the loading section 116 at a dispense section 118. This may include, but is not limited to, a belt conveyor system, a walking beam conveyor system, a plurality of rollers, a dial machine indexer, or pneumatic tubing.

In the illustrated embodiments, the transport mechanism is a cleated belt conveyor track 120. As shown in FIGS. 3-6, the cleated belt conveyor track 120 is configured in a vertical orientation which conveys upward, moving containers 114 from the loading section 116 upwards to a dispense section 118 which is at a higher elevation than the loading section 116. The conveyor belt includes a plurality of cleats 122 which leverage gravity to create shelves for the containers 114 to ride up the conveyor belt. The distance between cleats 122 on the cleated belt conveyor track 120 should be greater than the width of the containers 114 such that the containers may be held by the cleats 122 as the cleated belt conveyor track 120 is in use. The cleats 122 extend outward from the cleated belt conveyor track 120 to a distance that allows the containers 114 to be held securely. In this regard, the cleated belt conveyor track 120 operates as an elevator for the containers 114 to transport the containers 114 to the dispense section 118. The cleated belt conveyor track 120 can further leverage gravity to ensure security of the containers 114 on the cleat 122 by having the cleated belt conveyor track 120 be positioned at an angle such that the cleated belt conveyor track 120 is not perpendicular to the ground.

Cleats 122 on the cleated belt conveyor track 120 may contain multiple containers 114. Additionally, the containers 114 may be oriented in a variety of positions. Containers 114 oriented in a horizontal direction with respect to the cleat 122 lie with the circular ends of a cylindrical container tangential to the conveyor belt (i.e., with the height of the container parallel to the length of the cleat). Containers 114 oriented in a vertical direction with respect to the cleat 122 lie with an open end of the container 114 perpendicularly facing outwards from the cleat 122. It is preferred that the entire conveyor is wide enough to hold at least two containers 114 in a horizontal orientation (i.e., parallel to the cleats).

Figure 5:
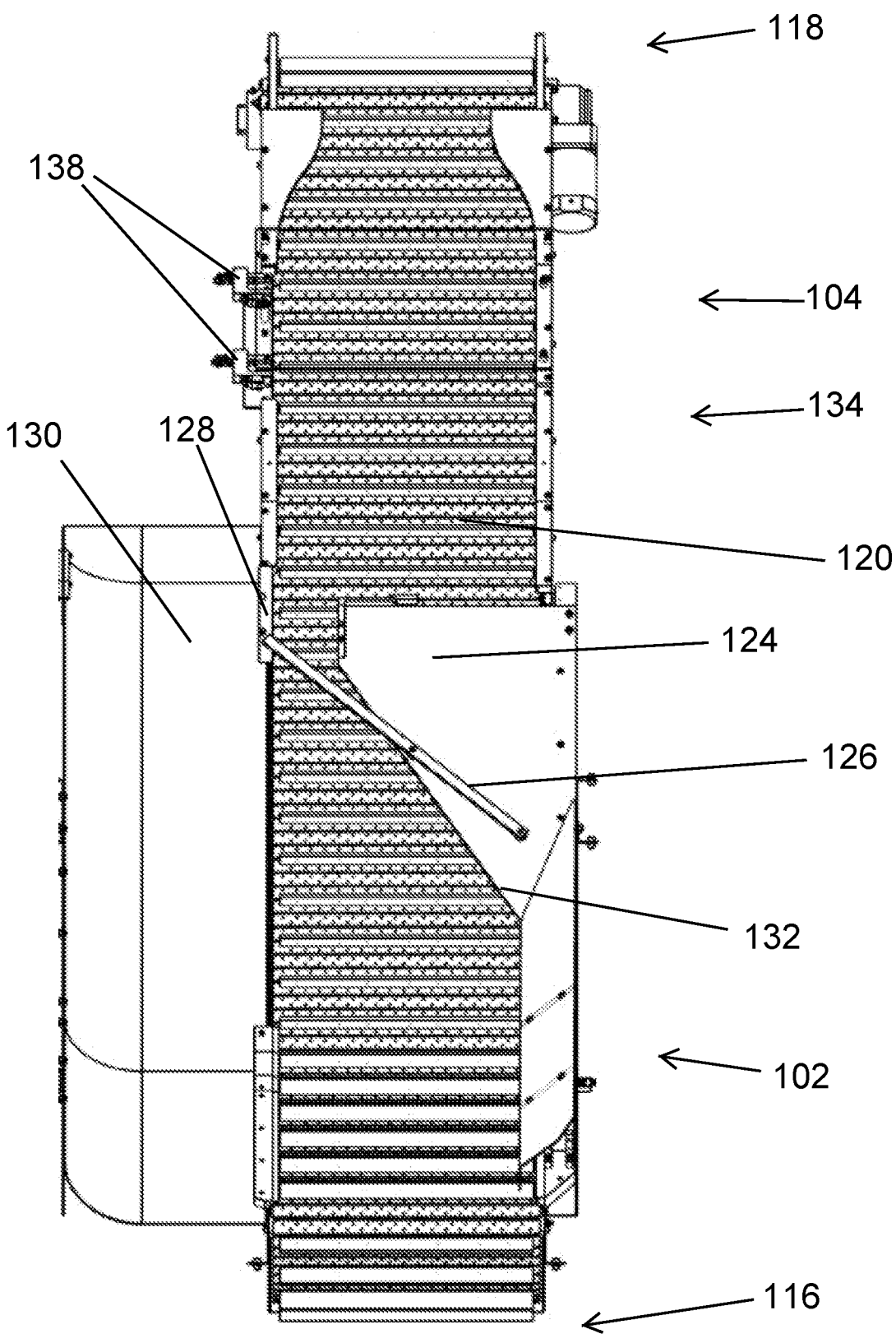
FIG. 5 shows a front view of the container singulator apparatus of FIG. 3, according to an example embodiment of the present disclosure.
Figure 6:
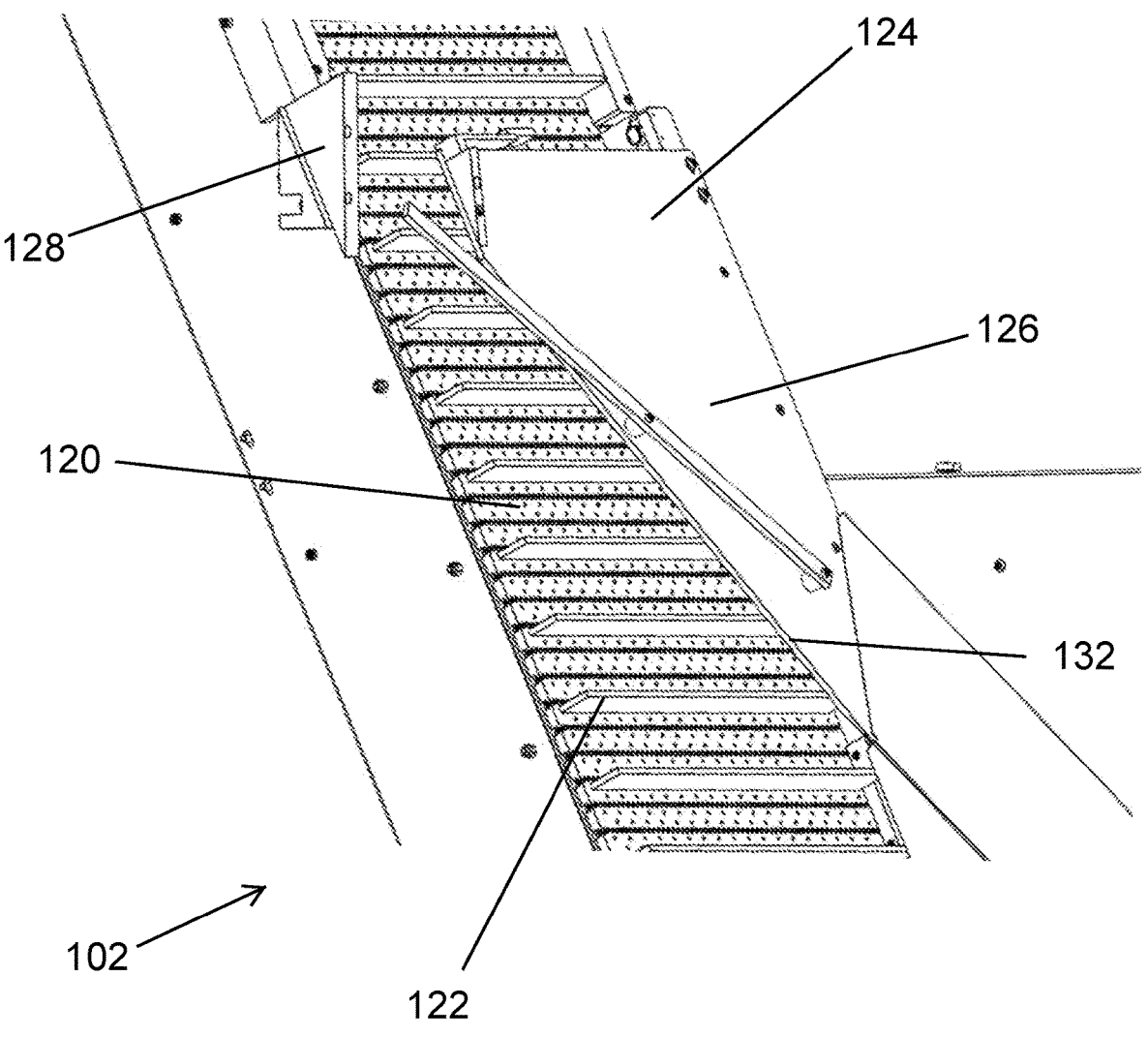
FIG. 6 shows an enlarged isometric front left view of the container singulator apparatus of FIG. 3 with a guide plate removed for clarity, according to an example embodiment of the present disclosure.
Figure 8:
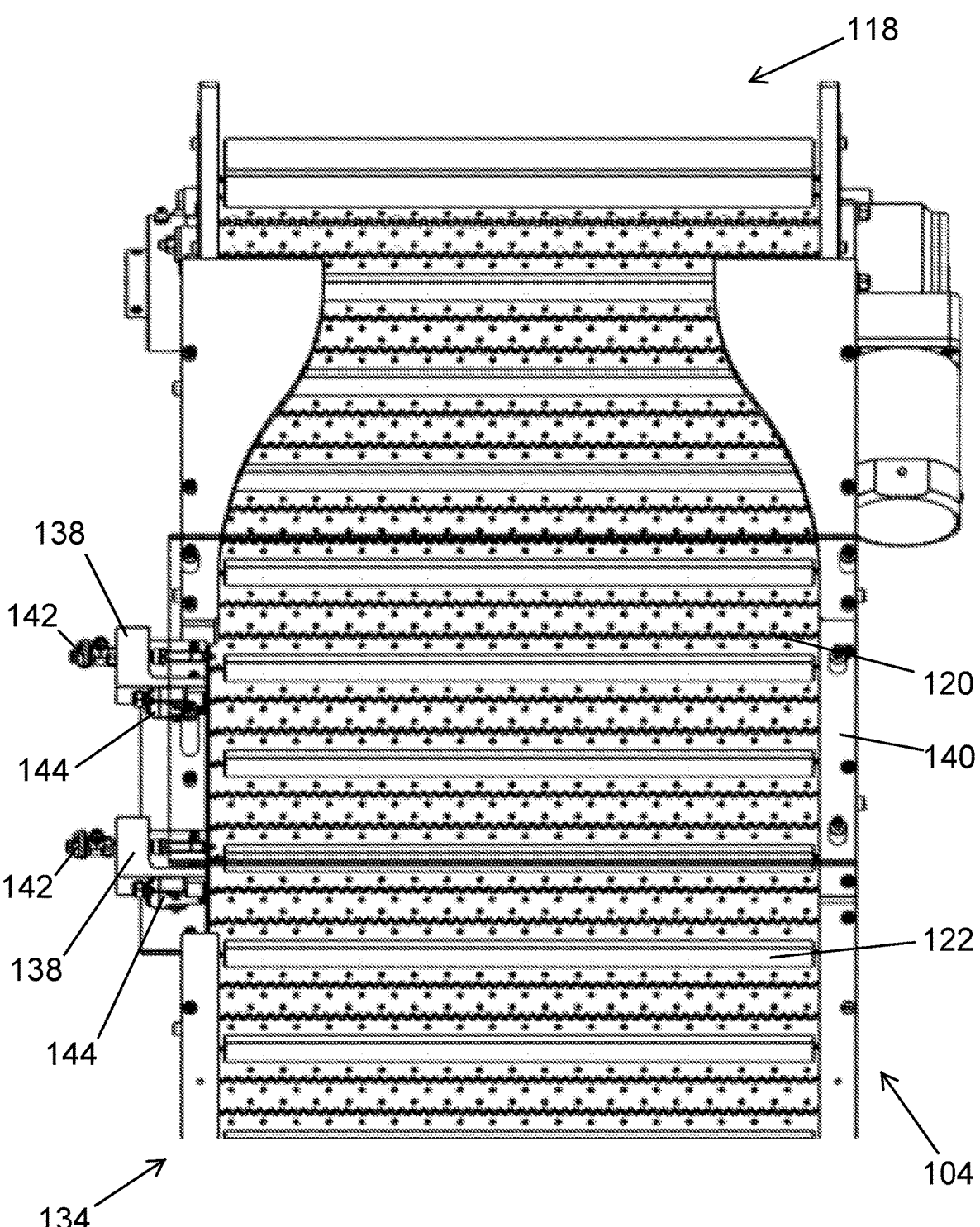
FIG. 8 shows a front view of an air sort station of the container orienting and sorting system of FIG. 1, according to an example embodiment of the present disclosure.
Figure 9:
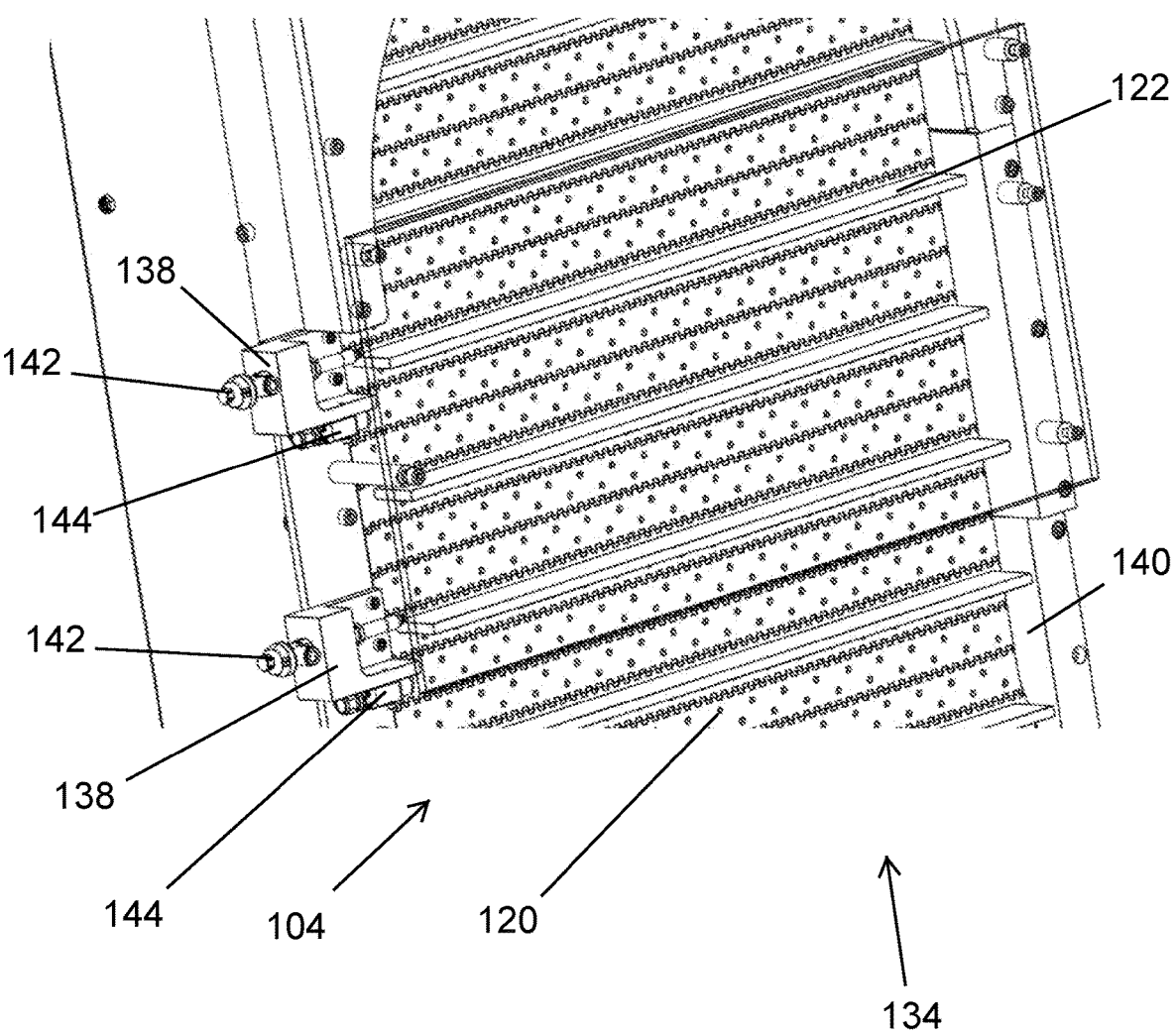
FIG. 9 shows an enlarged isometric front left view of the air sort station of FIG. 8, according to an example embodiment of the present disclosure.
Figure 10:
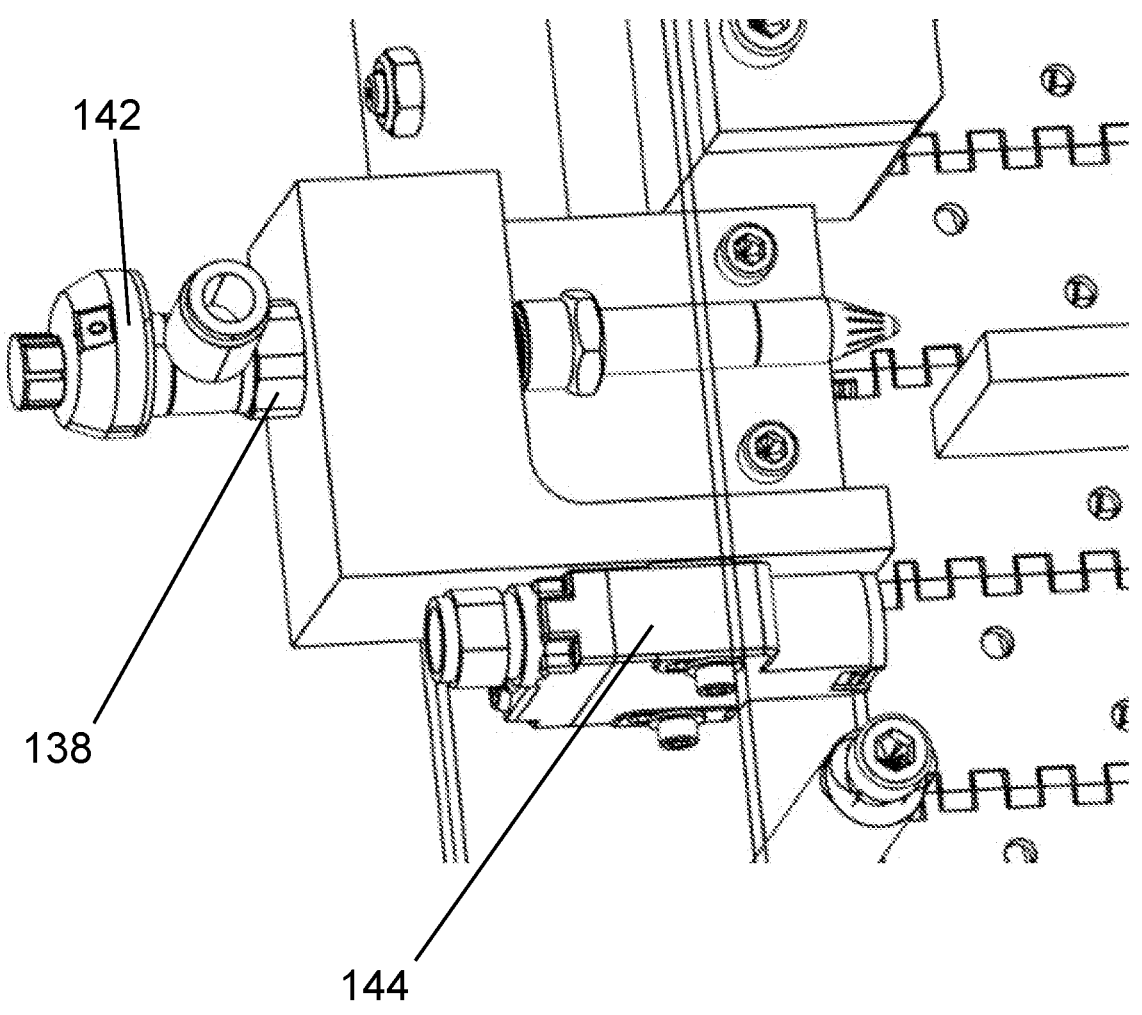
FIG. 10, shows an enlarged isometric front view of an air nozzle of the air sort station of FIG. 8, according to an example embodiment of the present disclosure.

As the containers 114 exit the loading section 116 and are directed upward by the cleated belt conveyor track 120, the containers 114 encounter a push plate 124. The push plate 124 can be any material suitable to push the empty containers 114 that come into contact with the push plate 124. As one such example, the push plate 124 may be a metal. As shown in FIGS. 5 and 6, the push plate 124 is located along the length of the cleated belt conveyor track 120. The push plate 124 extends outward from the cleated belt conveyor track 120 at a distance far enough that the cleats 122 may pass under the push plate 124 but close enough that containers 114 with a width larger than the cleats 122 may come into contact with the push plate 124.

The push plate 124 has a first surface parallel to the width of the cleated belt conveyor track 120. The first surface contains a push edge 132 that forms an angle with the edge of the conveyor belt. The angle of the push edge 132 causes the width of the cleated belt conveyor track 120 to increase from the bottom end of the cleated belt conveyor track 122 (i.e., by the loading section) to the top end of the cleated belt conveyor track 120 (i.e., by the dispense section). The push edge 132 may be dull enough to ensure the containers 114 are not broken or damaged upon contact with the push edge 132. At the highest height of the push plate 124, the push plate 124 should extend far enough along the width of the cleated belt conveyor track 120 that the push plate 124 is configured to enable a single container 114 in the horizontal orientation to pass through on the cleated belt. As a result, the angle of the push edge 132 directs containers 114 towards one particular side of the cleated belt conveyor track 120. In the illustrated embodiment of FIGS. 3-6, the push edge 132 directs containers 114 to a left side of the cleated belt conveyor track 120. Rows of cleats 122 that have multiple containers 114 thus contain containers 114 that are pushed off of the cleated belt conveyor track 120 by the push plate 124. It will be appreciated that in other embodiments, the width and angle of the push plate 124 may differ.

Optionally, the container singulator apparatus 102 may further include a divider 126. The divider 126 is intended to push containers 114 that are in the vertical direction towards an edge of the cleated belt conveyor track 120 and off of the cleated belt conveyor track 120. In the illustrated embodiment, the divider 126 is intended to push containers 114 in the vertical direction to the left side of the cleated belt conveyor track 120 (i.e., with the height of the containers 114 perpendicular to the length of the cleat 122). Thus, the divider 126 is intended to ensure all containers 114 are oriented in the same direction.

The divider 126 is positioned between the bottom end of the cleated belt conveyor track 120 and the top end of the cleated belt conveyor track 120. The divider 126 extends outward from the cleated belt conveyor track 120 at a distance farther than the push plate 124, but close enough so that containers 114 oriented in the vertical direction may be knocked off by the divider 126. The divider 126 can be any material suitable to push the empty containers 114 that come into contact with the divider 126. As one such example, the divider 126 may be a metal.

The divider 126 has an arm extending at an angle from the edge of the cleated belt conveyor track 120. In some embodiments, this angle may be the same as the angle of the push edge 132. In other embodiments, the divider 126 is at an angle greater than or less than the angle of the push edge 132 with respect to the edge of the cleated belt conveyor track 120. An ideal divider 126 angle is one that successfully pushes vertical containers 114 off of the cleated belt conveyor track 120. If the divider 126 is too horizontal (i.e., closer to parallel with the cleats 122), the containers 114 may not be pushed off of the cleated belt conveyor track 120 and instead may become stuck to the divider 126 as the cleated belt conveyor track 120 continues to move causing a jam or disruption in the process. If the divider 126 is too vertical (i.e., closer to perpendicular with the cleats 122), the divider 126 must become longer to ensure all containers 114 along any portion of the length of a cleat 122 may pass by the divider 126. If the divider 126 is longer, the cost of the design increases. Therefore, the ideal divider angle 126 is between 0° and 90° with respect to the cleats 122 on the cleated belt conveyor track 120.

Depending on the embodiment, the divider 126 may be adjacent to or above the push plate 124. In embodiments where the divider 126 is adjacent to the push plate 124, such as the illustrated embodiment shown in FIGS. 3-6, the divider 126 may be affixed directly to the push plate 124. In other embodiments, the divider 126 may be affixed to the ramp 128. Additionally, the divider 126 may be directly affixed to the main frame 110. The divider 126 may be coupled through the use of screws, nails, or other coupling mechanisms. It should be appreciated that the identified coupling mechanisms in the application are exemplary and other coupling mechanisms may be added or omitted in other embodiments of the container singulator apparatus 102.

A top end of the divider 126 is located on the side closest to the dispense section 118, and in the illustrated embodiments where the divider 126 meets with the ramp 128. The divider 126 pushes containers 114 in a vertical direction to the ramp 128. The ramp 128 can be any material suitable to push the empty containers 114 that come into contact with the ramp 128. As one such example, the ramp 128 may be a metal.

The ramp 128 is positioned adjacent to the left side of the cleated belt conveyor track 120. Like the push plate 124 and the divider 126, the ramp 128 is also positioned between the bottom end of the cleated belt conveyor track 120 and the top end of the cleated belt conveyor track 120. The ramp 128 extends perpendicularly outward from the cleated belt conveyor track 120 to create a barrier for containers 114 approaching the left side of the cleated belt conveyor track 120. As containers 114 approach the ramp 128, any container 114 that is extending off of the edge of the cleated belt conveyor track 120 (i.e., the length of the containers 114 not fully contained on the cleat 122), as an example, due to the push plate 124 or the divider 126 moving the container 114 beyond the edge, is pushed off by the ramp 128. The ramp 128 exerts downward force onto the container 114 extending off of the edge of the cleated belt conveyor track 120. Containers 114 having a length oriented entirely on the cleated belt conveyor track 120 pass by the ramp 128 without ever coming into contact with the ramp 128.

In some embodiments, the container singulator apparatus 102 includes a guide plate 130. The guide plate 130 is affixed to the side of the cleated belt conveyor track 120 where containers 114 fall off by forces exerted by the push plate 124, the divider 126, or the ramp 128. The guide plate 130 may be affixed to the main frame 110. The guide plate 130 may be coupled through the use of screws, nails, or other coupling mechanisms. It should be appreciated that the identified coupling mechanisms in the application are exemplary and other coupling mechanisms may be added or omitted in other embodiments of the container singulator apparatus 102. The guide plate 130 may be any material suitable to guide the empty containers 114 towards the loading section 116. As one such example, the guide plate 130 may be a metal.

The purpose of the guide plate 130 is to direct containers 114 back to the loading section 116 to be properly reloaded onto the cleated belt conveyor track 120. In some embodiments such as the illustrated embodiment, the guide plate 130 may be curved on the side farthest from the cleated belt conveyor track 120 to allow containers 114 to be guided back to the loading section 116. In other embodiments, the guide plate 130 may include multiple sheets components creating a ramp and sidewall for the containers 114. It will be appreciated that other configurations of the guide plate may be used with the container orienting and sorting system 100.

Upon exit from the container singulator apparatus 102, the containers 114 remain on the cleated belt conveyor track 120 with each cleat 122 containing one container 114. In embodiments where containers 114 are cylindrical containers such as pill vials, the containers 114 must then be sorted based on orientation. This application refers to containers 114 with the open end facing the left side of the illustrated embodiments, or the guide plate 130, as the left position (illustrated by 114a) and containers 114 with the open end facing the right side of the illustrated embodiments, or the push plate 124, as the right position (illustrated by 114b). As a container 114 has both an open end and a closed end, containers 114 on different cleats 122 may be facing different directions and be in different orientations than those on other cleats 122. As a result, a container sorting apparatus 104 is needed to ensure that all containers on the cleated belt conveyor track 120 are facing a homogenous direction. This application describes two container sorting apparatuses 104: the air sort station 134 as shown in FIGS. 8-11 and the mechanical probe sort station 136 as shown in FIGS. 13-16.

The present disclosure further includes a method for aggregating and sorting containers in a container singulator apparatus 200 as illustrated in FIG. 7. In a first step 202, containers are received from a loading section. In a second step 204, the containers are transported to a cleated belt by a belt support affixed to the main frame having a first end located adjacent to a loading section and a second end located a fixed distance from the loading section. In a third step 206, the containers are transported by the cleated belt configured to move the at least one container from a first end located adjacent to the loading section to a second end located at the fixed distance from the loading section, the cleated belt having individual rows configured to receive containers from the loading section and hold the containers until the row of the cleated belt reaches the second end of the belt support, a width of each row configured to hold at least two containers in a horizontal orientation. In a fourth step 208, the containers are oriented on the cleated belt by a ramp positioned adjacent to a left side of the cleated belt, an end of the ramp positioned within or above the loading section. In a fifth step 210, the containers are oriented on the cleated belt by a divider positioned between the first end and the second end of the belt support, the divider configured to direct containers that are hanging over a side of the row to move onto the ramp. In a sixth step 212, the containers are oriented on the cleated belt by a plate located between the first end and the second end of the belt support, a top end of the plate located adjacent to or below the divider, the plate positioned over the cleated belt and having an angled edge that increases in width from a bottom end to the top end, the width at the top end configured to enable a single container in the horizontal orientation to pass between the divider and the plate on the cleated belt.

Air Sort Station Embodiment

FIGS. 8-11 illustrate the air sort station 134. The air sort station 134 includes an air nozzle 138, a bumper rail 140, a flow control 142, a valve 143, and a sensor 144. The air nozzle 138 is located adjacent to a side of the cleated belt conveyor track 120. In the illustrated embodiment, it is located adjacent to the left side of the cleated belt conveyor track 120. The air nozzle 138 is configured to blow pressurized air perpendicularly towards the cleated belt conveyor track 120 and onto passing containers 114. If a container 114 has its open end facing away (114b) from the air nozzle 138, the air nozzle 138 blows pressurized air onto the bottom edge of the container 114 and pushes the container 114 into the middle or right side of the cleat 122. A bumper rail 140 located on the side of the cleated belt conveyor track 120 opposite the air nozzle 138 prevents containers 114 from being blown off of the cleated belt conveyor track 120. In some embodiments, the bumper rail 140 may extend below the height of the air nozzle 138. Thus, the containers 114 are optimally divided with containers 114 facing one orientation on one side of the cleated belt conveyor track 120 and containers 114 facing another orientation on the other side of the cleated belt conveyor track 120.

The air nozzle 138 is connected to a pressurized air source and is controlled by a flow control 142 and a valve 143. The flow control 142 is fluidly coupled between the pressurized air source and the air nozzle 138 and is configured to direct the flow of pressurized air. In some embodiments, the flow control 142 is controlled by a controller 147 which is communicatively coupled to a sensor 144. The controller 147 receives data from the sensor 144 and transmits control instructions to the flow control 142 as to whether the flow of compressed air should be increased or decreased.

In some embodiments, there may be multiple air nozzles 138. In embodiments with multiple air nozzles 138, each air nozzle 138 is coupled to at least one flow controls 142, valves 143, and sensors 144.

Figure 11:
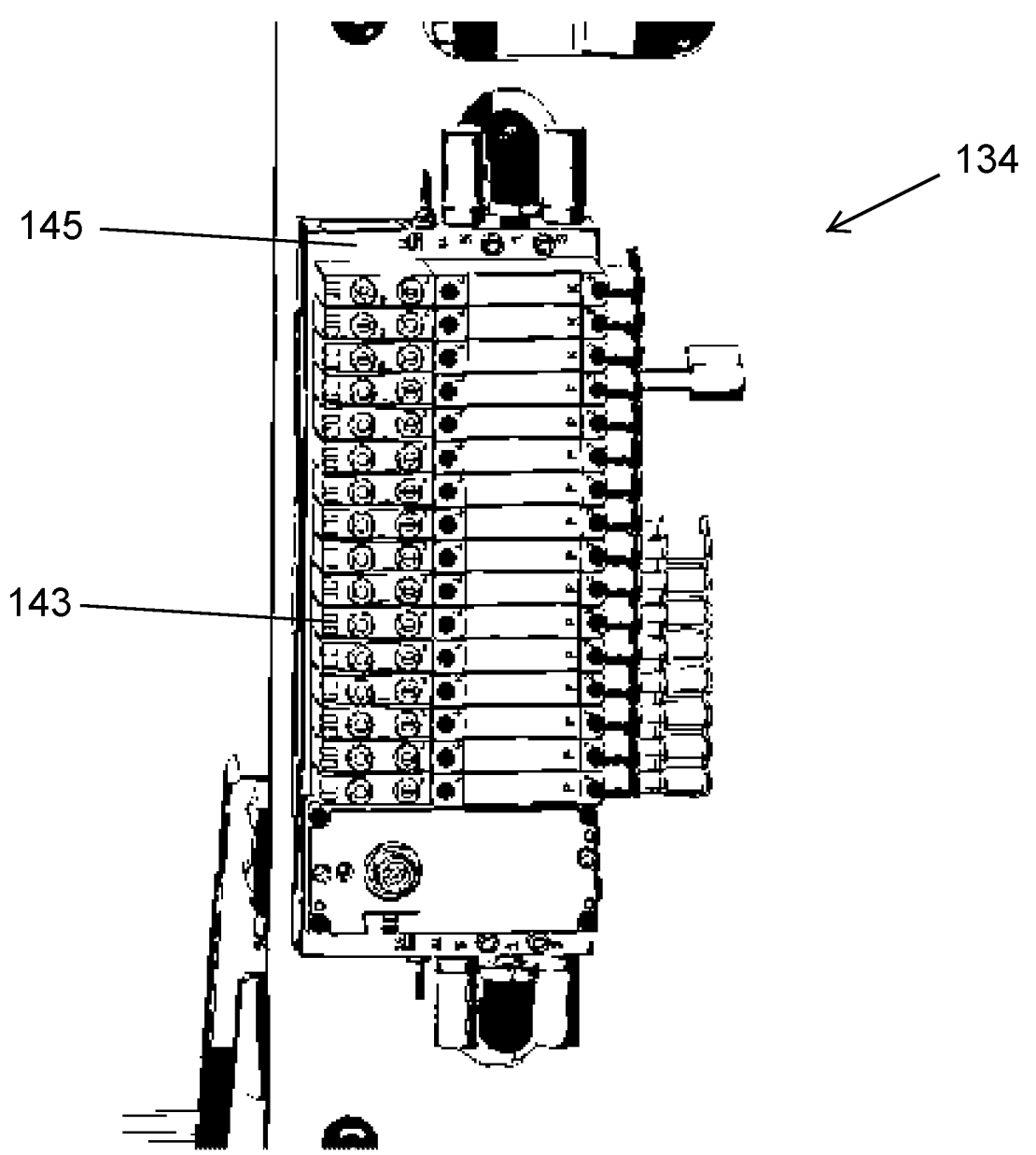
FIG. 11 shows a valve manifold of the air sort station, according to an example embodiment of the present disclosure.

Similarly, at least one valve 143 is fluidly coupled between the pressurized air source and the air nozzle 138 and is configured to regulate the flow of pressurized air. The valve 143 is controlled by a controller 147 which is communicatively coupled to a sensor 144. The controller 147 receives data from the sensor 144 and transmits control instructions to the air nozzle 138 as to whether the air nozzle 138 should blow pressurized air. The number of valves 143 may vary. As shown in FIG. 11, multiple valves 143 may be contained in a valve manifold 145. The manifold 145, which is located on the backside of the air sort station 134, may contain housing for multiple valves 143. In other embodiments, there may be a different number of valves 143 contained in the valve manifold 145. The number of valves 143 may be dependent on the size of the cleated belt conveyor track 120 or the distance between cleats 122 on the cleated belt conveyor track 120. It will be appreciated that the number of valves 143 in fluid control with a singular air nozzle 138 may vary.

When a container 114 on the cleat 122 passes by the air nozzle 138, the controller 147 determines the proper course of action based on data from the sensor 144 regarding the containers 114 orientation and other parameters. The controller 147 then sends movement instructions to the valve to initiate one of two courses of action.

If the sensor 144 senses an open end of the container 114a passing the air nozzle 138 on the edge of the cleated belt conveyor track 120, the controller 147 determines that the valve 143 should not open and allows the container 114a to pass the direction of the air nozzle 138 without any pressurized air blown. The container 114a remains on the side of the cleated belt conveyor track 120 located closest to the air nozzle 138. In the illustrated embodiment, the container 114a remains on the left side of the cleated belt conveyor track 120.

If the sensor 144 senses a closed end of the container 114b passing the air nozzle 138 on the edge of the cleated belt conveyor track 120, the controller 147 determines that the valve 143 should open and transmits a signal to the valve 143 to open. Once opened, the air nozzle 138 blows pressurized air towards the container 114b thereby pushing the container 114b toward the opposite edge of the cleated belt conveyor track 120. The container 114b moves laterally in the direction toward the bumper rail 140.

In another embodiment, the sensor 144 may merely communicate that the cleat 122 or container 114 has passed by the sensor 144 and a lesser amount of air is blown onto all containers 114 on the cleated belt conveyor track 120. In this embodiment, containers 114 with open ends facing left, will be unaffected by the air as the flow of pressurized air is weakened from other embodiments.

The type of sensor 144, the location of the sensor 144, and the force of the pressurized air from the air nozzle 138 may all be adjusted to adjust the distance the container 114 travels laterally from the flow of air. For instance, the sensor 144 may be an optical sensor, a micro switch, or any sensor appropriate to determine the orientation of the container 114. In the illustrated embodiment, the sensor 144 is an optical sensor located upstream from the air nozzle 138, though it should be appreciated that the identified sensor mechanisms in the application are exemplary and other sensor mechanisms may be added or omitted in other embodiments of the container sorting apparatus 104.

The present disclosure further includes a method for aggregating and sorting containers in a container sorting apparatus 300 as illustrated in FIG. 12. In a first step 302, at least one container is transported by a transport mechanism from a first end located adjacent to a loading section to a second end located at a fixed distance from the loading section. In a second step 304, a sensor detects whether an open end or a closed end of at least one container faces a sensor adjacent to the transport mechanism. In a third step 306, the sensor transmits a signal when the closed end of the first container faces the sensor causing at least one valve fluidly coupled between a pressurized air source and at least one air nozzle, to open, which causes the pressurized air to move the at least one container laterally toward a bumper rail, the at least one valve configured to regulate a flow of the pressurized air.

Mechanical Probe Sort Station Embodiment

FIGS. 13-16 illustrates a second container sorting apparatus 104: the mechanical probe sort station 136. The mechanical probe sort station 136 includes a cam belt 146 with cam-driven probes 148, and a cam track 150.

The cam belt 146 is configured to transport cam-driven probes 148 along a conveyor belt and is adjacent to the cleated belt conveyor track 120. In some embodiments, the cam belt 146 may be touching the cleated belt conveyor track 120. In yet other embodiments, cam belt 146 and the cleated belt conveyor track 120 may be the same conveyor belt. The cam belt 146 is powered by a motor or other related actuator. In some embodiments, this motor powers both the cleated belt conveyor track 120 and the cam track 150. It should be appreciated that the motor identified within the application is purely exemplary and that other motors or actuators may be added or omitted in other embodiments of the mechanical probe sort station 136.

The cam belt 146 includes individual rows that are spaced the same distance as the cleats 122 on the cleated belt conveyor track 120 such that the rows are aligned with the rows of the cleated belt conveyor track 120. At the center of each row of the cam belt 146 is one cam-driven probe 148.

Figure 16:
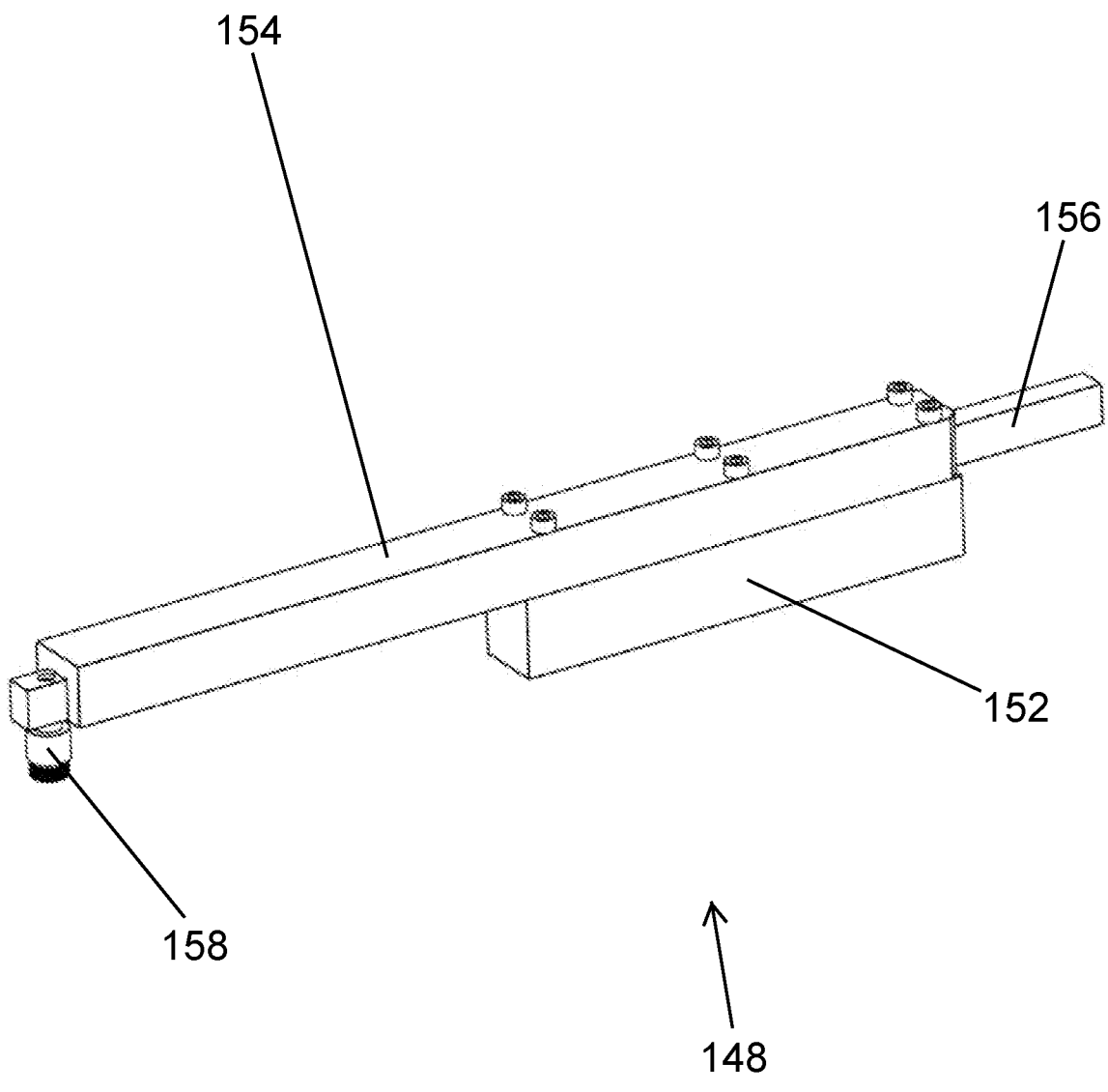
FIG. 16 shows an enlarged view of a probe of the mechanical probe sort station of FIG. 13, according to an example embodiment of the present disclosure.

As shown in FIG. 16, the cam-driven probes 148 include a block 152, a sleeve 154, an L-shaped rod 156, and a roller 158. The block 152 is coupled to the cam belt 146 through use of screws, nails, or other coupling mechanisms. Similarly, the sleeve 154 is coupled to a top face of the block 152 and extends outward from the cam belt 146. It should be appreciated that the identified coupling mechanisms in the application are exemplary and other coupling mechanisms may be added or omitted in other embodiments of the cam-driven probes 148.

The sleeve 154 is a three-sided rod creating a protrusion that acts as a housing to the L-shaped rod 156. The L-shaped rod 156 fits between two faces of the sleeve 154. The other end of the L-shaped rod 156 is a roller 158 configured to fit between the sides of the cam track 150 such that a cam-driven probe 148 may travel along the cam track 150.

The cam track 150, which holds the roller 158 of the L-shaped rod 156 of the cam-driven probes 148 controls the distance the L-shaped rod 156 extends toward the cleated belt conveyor track 120 and thus how far the cam-driven probes 148 probe the containers 114. In the illustrated embodiment, the cam track 150 has a v-shaped path that when the roller 158 of the L-shaped rod 156 travels, it pushes the cam-driven probe 148 outward over the cleated belt conveyor track 120 while traveling the first portion of the v-shape and retracts along the second portion of the v-shape. It will be appreciated that the path of the cam track 150 is purely exemplary and other configurations of the path of the cam track 150 may exist.

Figure 13:
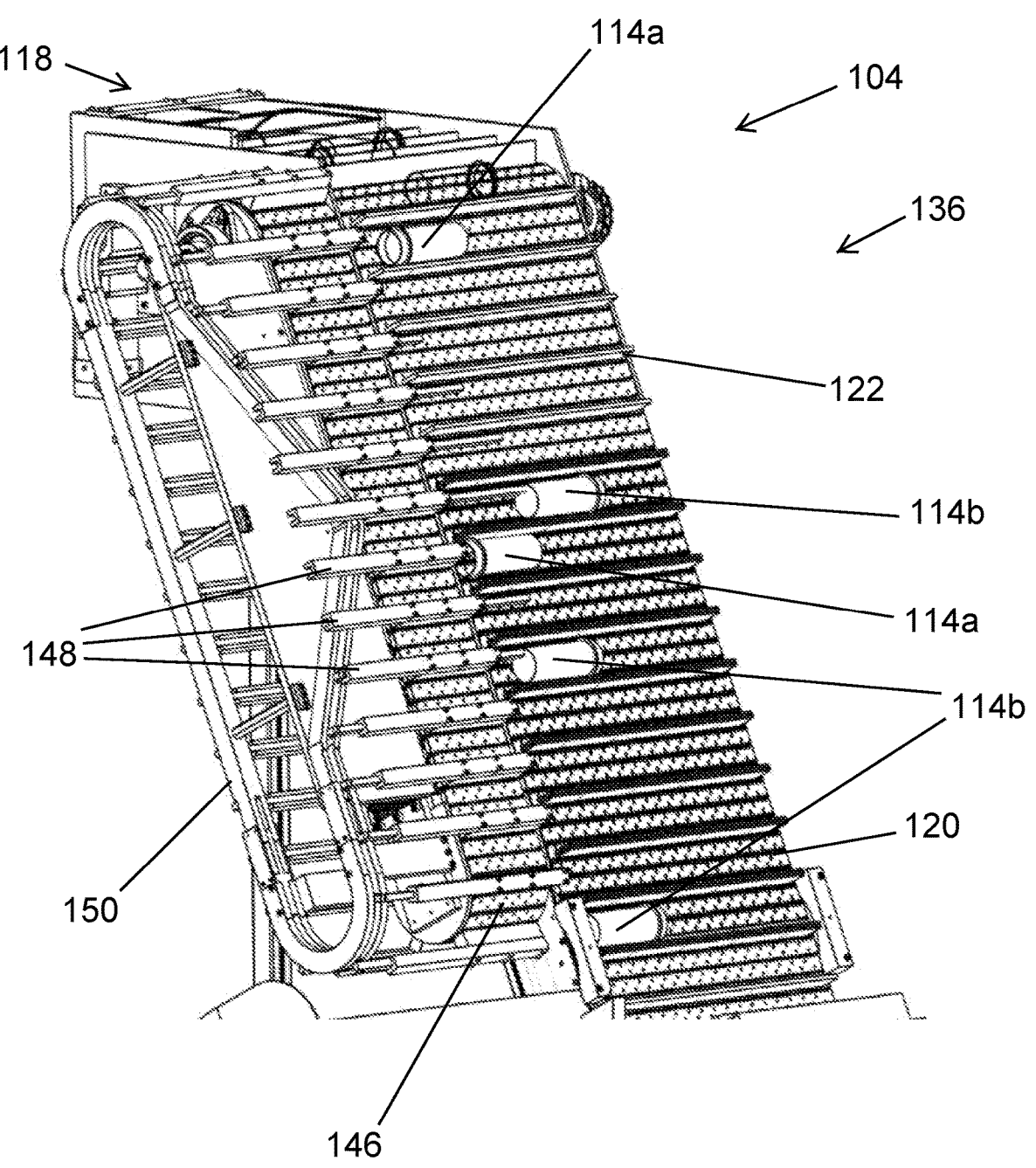
FIG. 13 shows an isometric front view of a mechanical probe sort station, according to an example embodiment of the present disclosure.
Figure 14:
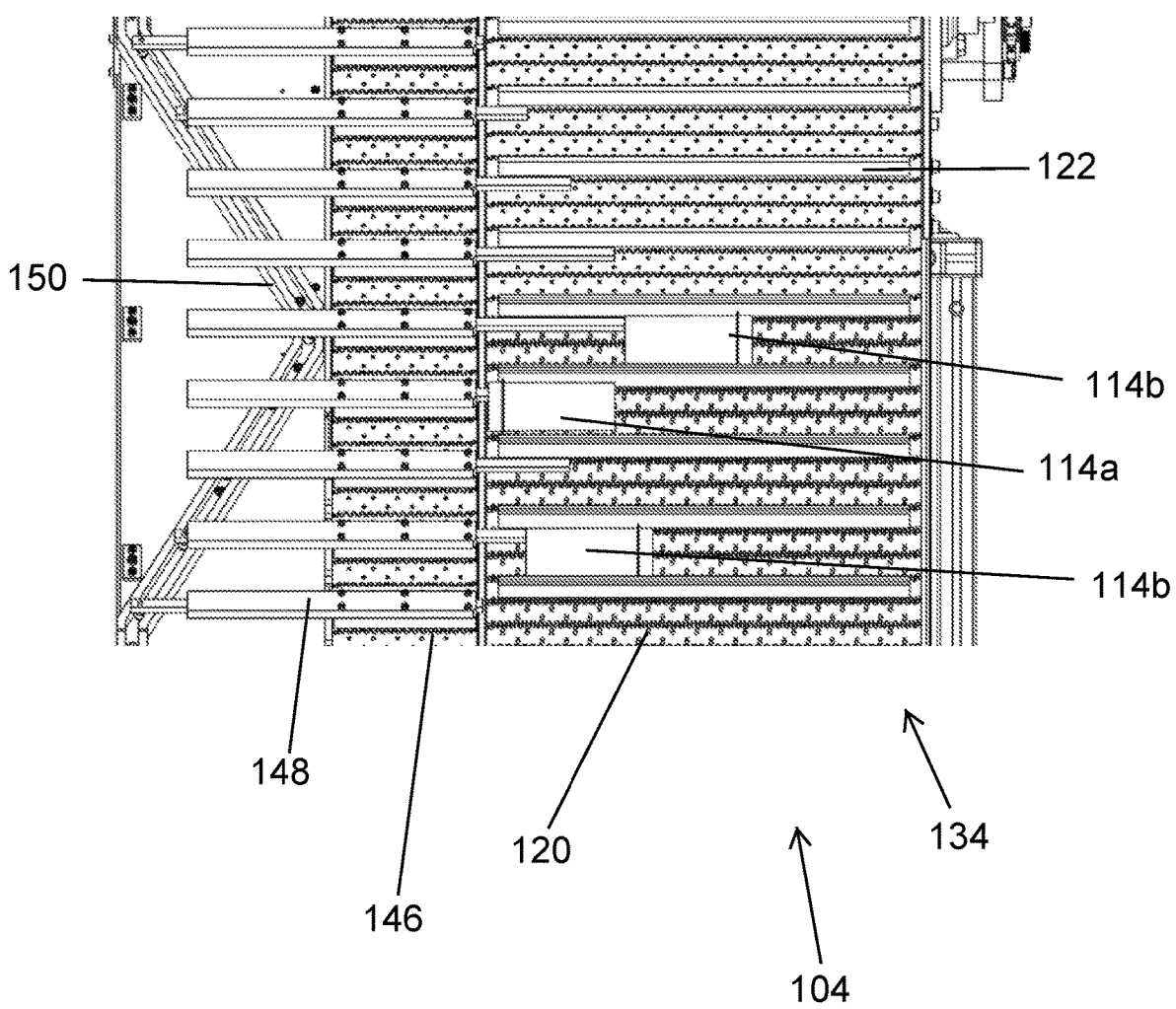
FIG. 14 shows an enlarged front view of the mechanical probe sort station of FIG. 13, according to an example embodiment of the present disclosure.
Figure 15:
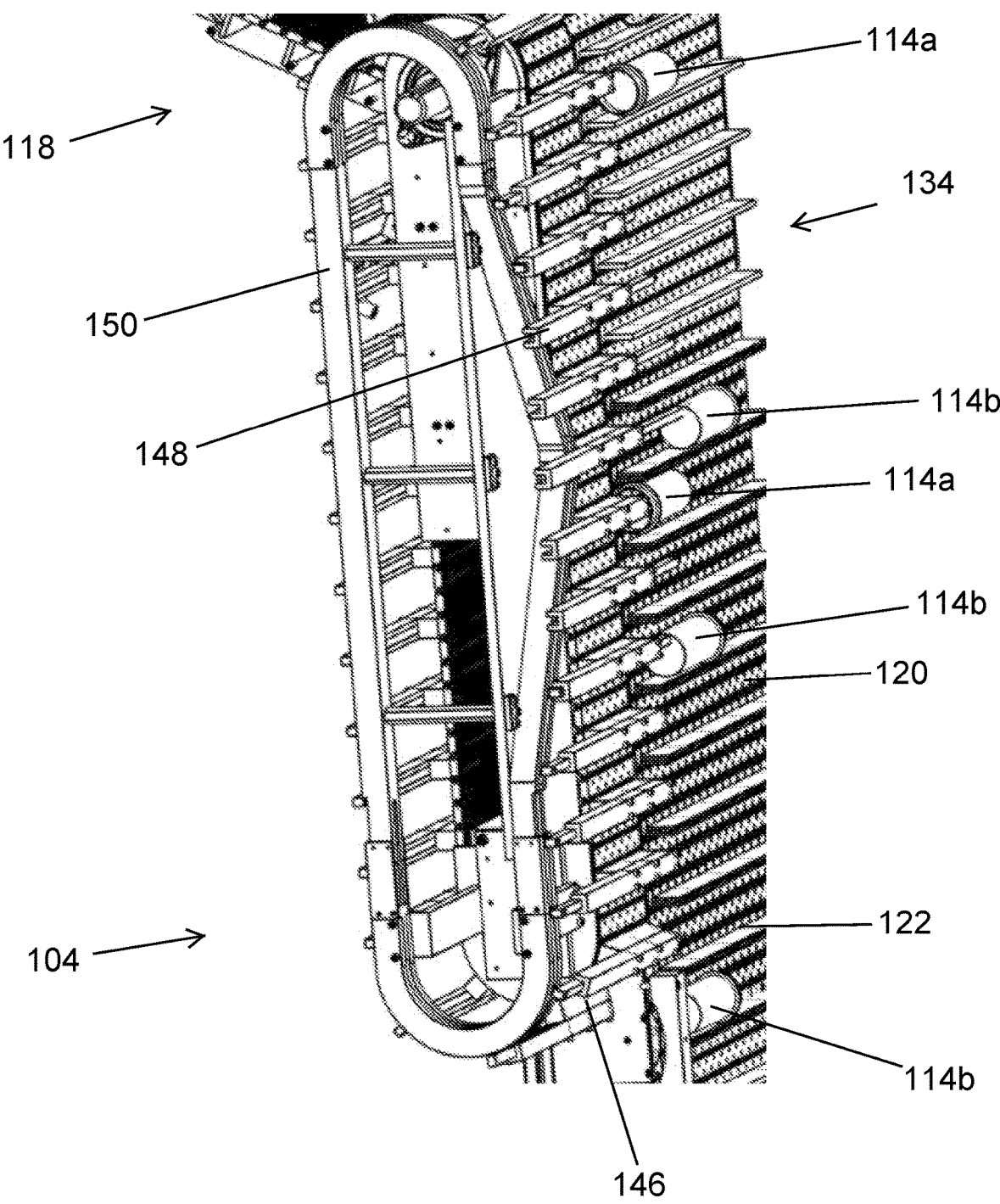
FIG. 15 shows an isometric left side view of the mechanical probe sort station of FIG. 13, according to an example embodiment of the present disclosure.

Similar to the air sort station 134 described above, the mechanical probe sort station 136 is configured to separate containers 114 by orientation and extend perpendicularly into the containers 114. Containers with open ends pointing in toward the left side (i.e., nearest the air nozzle 138 or cam-driven probes 148) 114a remain on the left side of the cleated belt conveyor track 120 and containers with open ends pointing in the other direction (i.e., farthest from the air nozzle 138 or cam-driven probes 148) 114b are moved to the right side of the cleated belt conveyor track 120. In the illustrated embodiment, the cam belt 146 is to the left of the cleated belt conveyor track 120 and thus the cam track 150 drives the cam-driven probes 148 to the right. As a result, and as shown in FIGS. 13-15, containers with an open end facing right 114b are pushed by the cam-driven probes 148 to the right as the L-shaped rod 156 interacts with the closed end of the container 114 pushing it to the right. Containers with an open end facing left 114a remain on the left side of the cleated belt conveyor track 120 as the L-shaped rod 156 is not long enough to interact with the closed end of the container 114 at such a distance.

It should be appreciated that other camming mechanisms may be operable with the mechanical probe sort station 136. Other embodiments may use different cam mechanisms to mechanically probe the containers 114. In one such example, the cam-driven probes 148 and cam track 150 may be replaced with a one-sided face cam with a spring configured to push a similar cam-driven probe into the containers 114. The face cam may contain internal holes which can mechanically couple to a probe that allows the rotary motion of the cam to transform into a linear probing motion. In this embodiment, the face cam may be powered by a motor or other related actuator or may be mechanically powered by a spring. In another example, the cam-driven probes 148 may be replaced with pivot arms that contain at least two independently moving portions. When one end of the pivot arm follows the cam track 150, it causes motion in the other pivot arm which may be configured to linearly probe the containers 114 on the cleated belt conveyor track 120. It should be appreciated that the cam mechanisms described herein are purely exemplary and other such cam mechanisms may be identified by persons having ordinary skill in the art.

The present disclosure further includes a method for aggregating and sorting containers in a container sorting apparatus 400 as illustrated in FIG. 17. In a first step 402, at least one container is received by a belt support having a first end located adjacent to a loading section and a second end located a fixed distance from the loading section, the belt support including a belt track and a cam track. In a second step 404, the at least one container is transported by a transport mechanism, the transport mechanism including a cleated belt configured to move containers from a first end located adjacent to the loading section to a second end located at a fixed distance from the loading section, the cleated belt having individual rows configured to receive containers from the loading section and hold the containers until the row of the cleated belt reaches the second end of the belt support. In a third step 406, the at least one container is probed with a cam-driven probe affixed to a cam belt positioned within the cam track and located adjacent to the cleated belt, the cam belt configured to move along the cam track, the cam belt including individual rows that are aligned with rows of the cleated belt, each row of the cleated belt including cam-driven probes that are configured to extend into a respective row of the cleated belt and retract.

Orientation Funnel Embodiment

Returning to FIGS. 1 and 2, as the containers 114 are pushed to the end of the cleated belt conveyor track 120, the containers 114 reach the dispense section 118 located at the upper end of the cleated belt conveyor track 120. The dispense section 118 drops the containers 114 into an orientation funnel 106 as shown in FIGS. 18-21. The orientation funnel 106 has an entrance section 160, a mid-section 162, and an exit port 164. The orientation funnel may be comprised of any material suitable to maintain its shape upon impact from a container 114.

The entrance section 160 of the orientation funnel 106 is located at the top end of the orientation funnel 106 and is where containers 114 enter from the cleated belt conveyor track 120. In the illustrated embodiments, the entrance section 160 has an entrance width that is at least as long as two container lengths. Preferably, the width of the entrance section 160 is the same width of the cleated belt conveyor track 120 to ensure that all containers 114 regardless of positioning on the cleated belt conveyor track 120 fall into the orientation funnel 106.

As the container 114 exits the cleated belt conveyor track 120, the container 114 enters either a first or second path. In the illustrated embodiment, the first path is located on the left side of the orientation funnel 106 and catches containers 114 that have been pushed by the air nozzle 138 or the cam-driven probes 148 (114a). The second path is located on the right side of the orientation funnel 106 and catches containers 114 that have not been pushed by either the air nozzle 138 or the cam-driven probes 148 (114b).

The entrance section 160 also has a bend between 60° and 120° that transitions the orientation funnel 106 from a horizontal orientation to a vertical orientation. It should be appreciated that the bend in the entrance section 160 may differ depending on the orientation and size of the cleated belt conveyor track 120. For instance, if the cleated belt conveyor track 120 is taller and has a steeper incline, the bend in the entrance section 160 may be minimal in attempt to assist containers 114 in a slower and more coordinated fall into the entrance section 160.

In the vertical orientation is the mid-section 162 of the orientation funnel 106. The mid-section 162 of the orientation funnel 106 is contained between the entrance section 160 and the exit port 164. The mid-section 162 has a transitioning width that transitions from the entrance width to an exit port width. This tapering causes containers 114 to rotate from a horizontal orientation to a vertical orientation as the container 114 falls from the entrance section 160 to the exit port 164 by acting as a slide for the containers 114. As the containers 114 rotate to a vertical orientation, the closed end of the container 114 falls first due to that side's heavier weight. When containers 114 exit the mid-section 162, the containers 114 are in a vertical orientation with the open end facing upwards regardless of which path the container 114 took.

Figure 18:
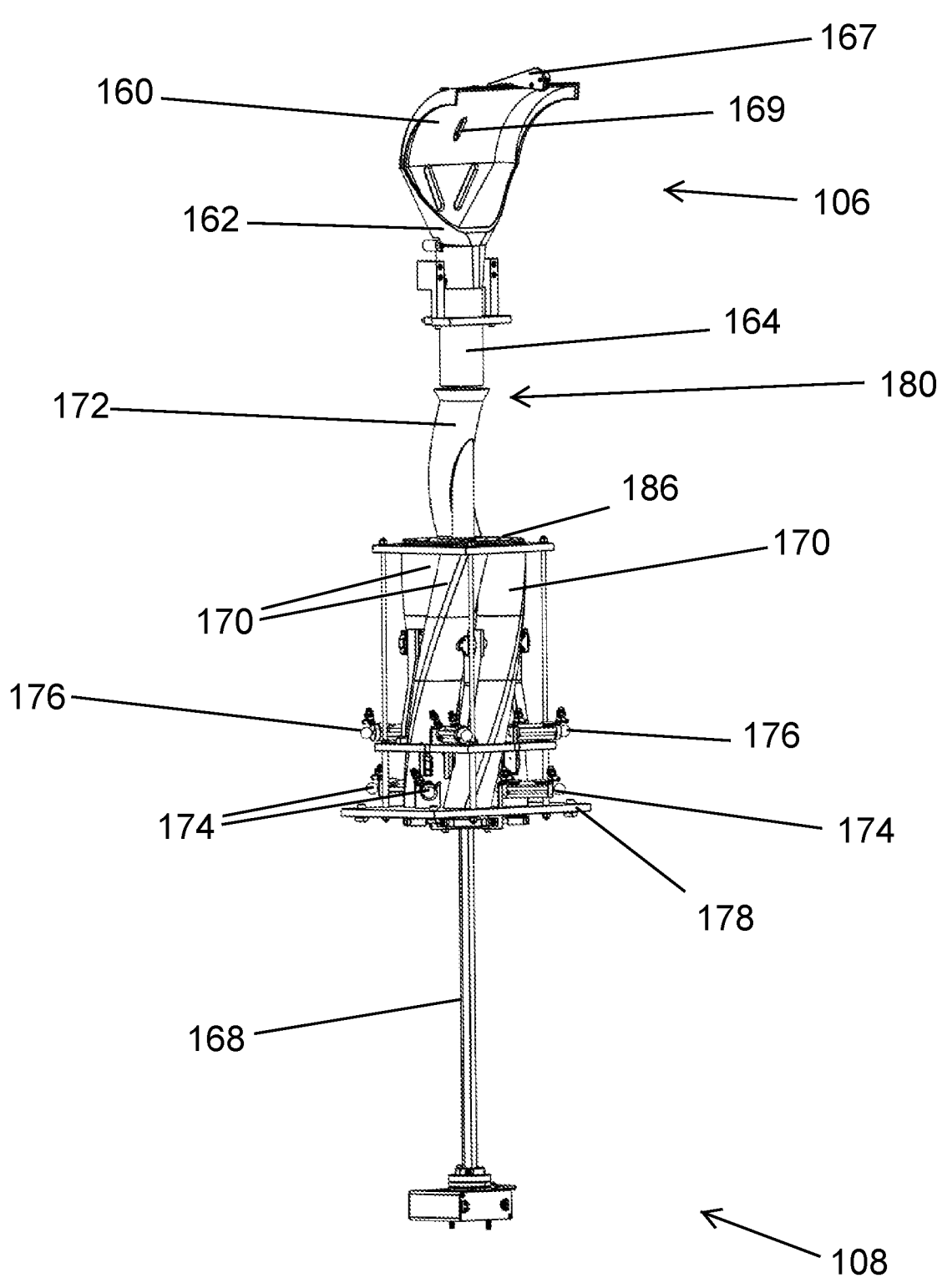
FIG. 18 shows an isometric view of an orientation funnel and container queue apparatus of container orienting and sorting system of FIG. 1, according to an example embodiment of the present disclosure.
Figure 19:
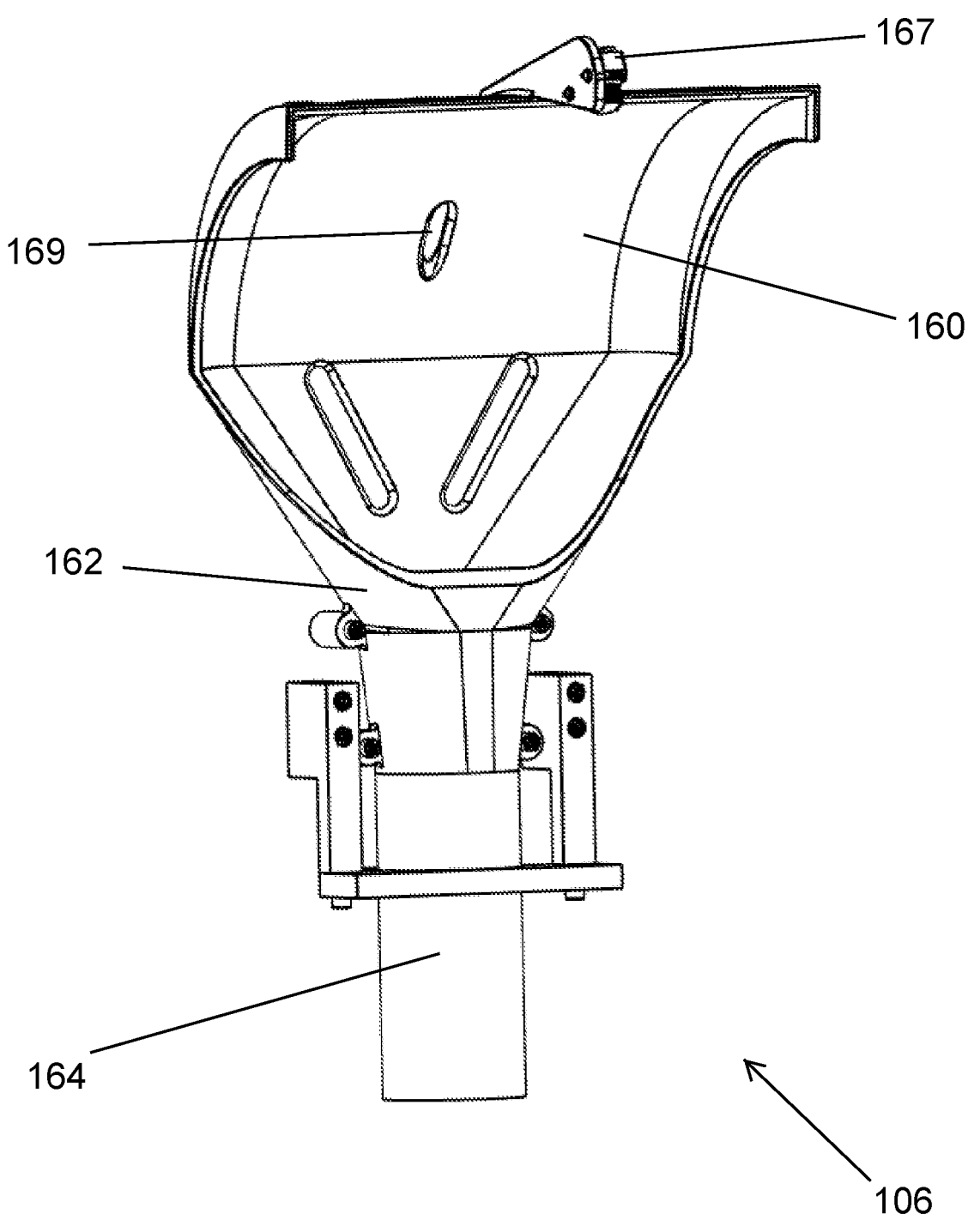
FIG. 19 shows an enlarged isometric view of the orientation funnel of FIG. 18, according to an example embodiment of the present disclosure.

After traveling through the mid-section 162, the containers 114 enter the exit port 164 located at the bottom end of the orientation funnel 106. The exit port 164 is vertically oriented below the top end of both the entrance section 160 and the mid-section 162 of the orientation funnel 106. The exit port 164 has an exit port width that is less than the entrance width which is configured to enable only containers 114 in the vertical orientation to pass through. The exit port 164 is coupled the container queue apparatus as shown in FIG. 18, which is further described below.

Figure 20:
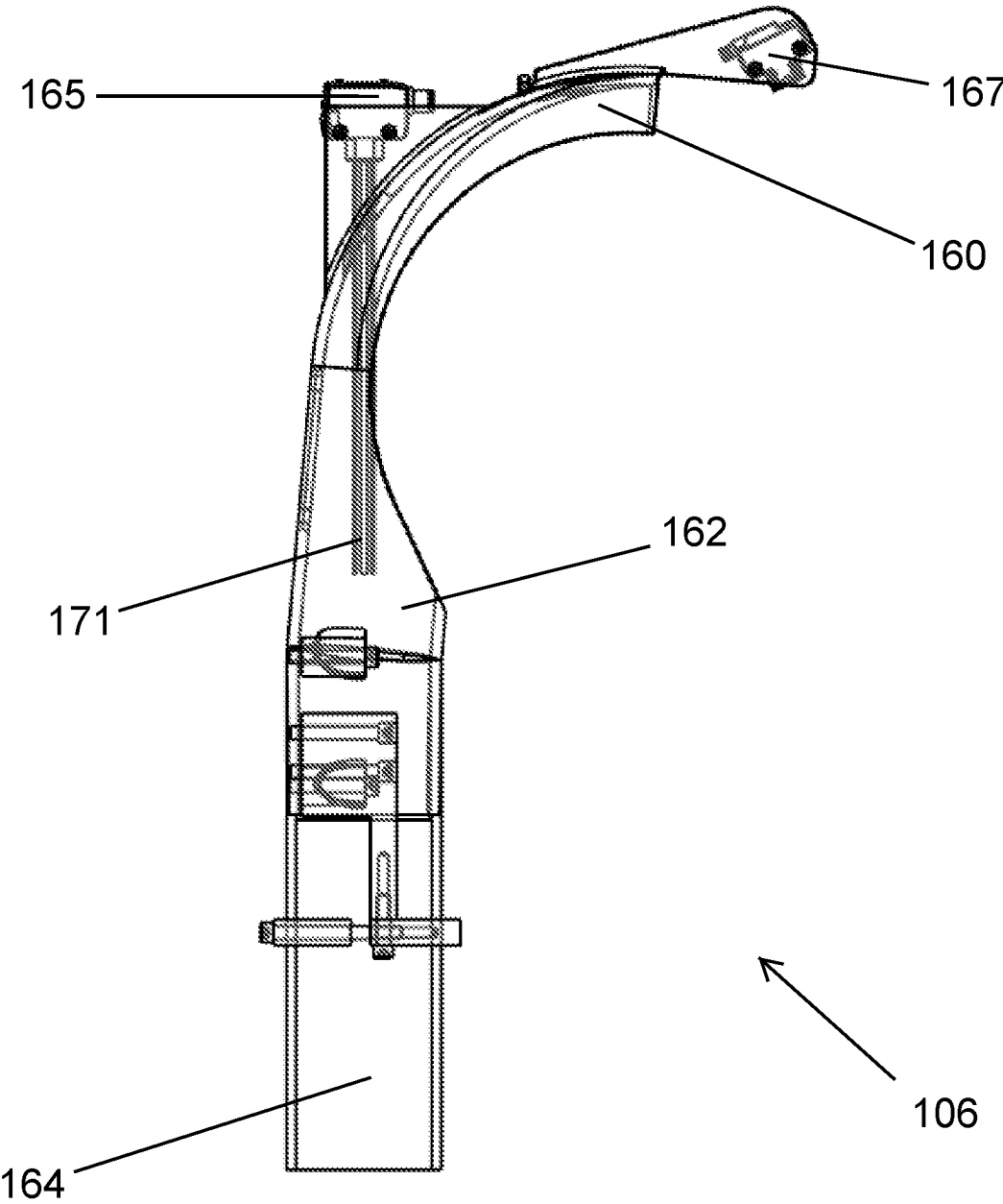
FIG. 20 shows a left view of the orientation funnel of FIG. 18, according to an example embodiment of the present disclosure.
Figure 21:
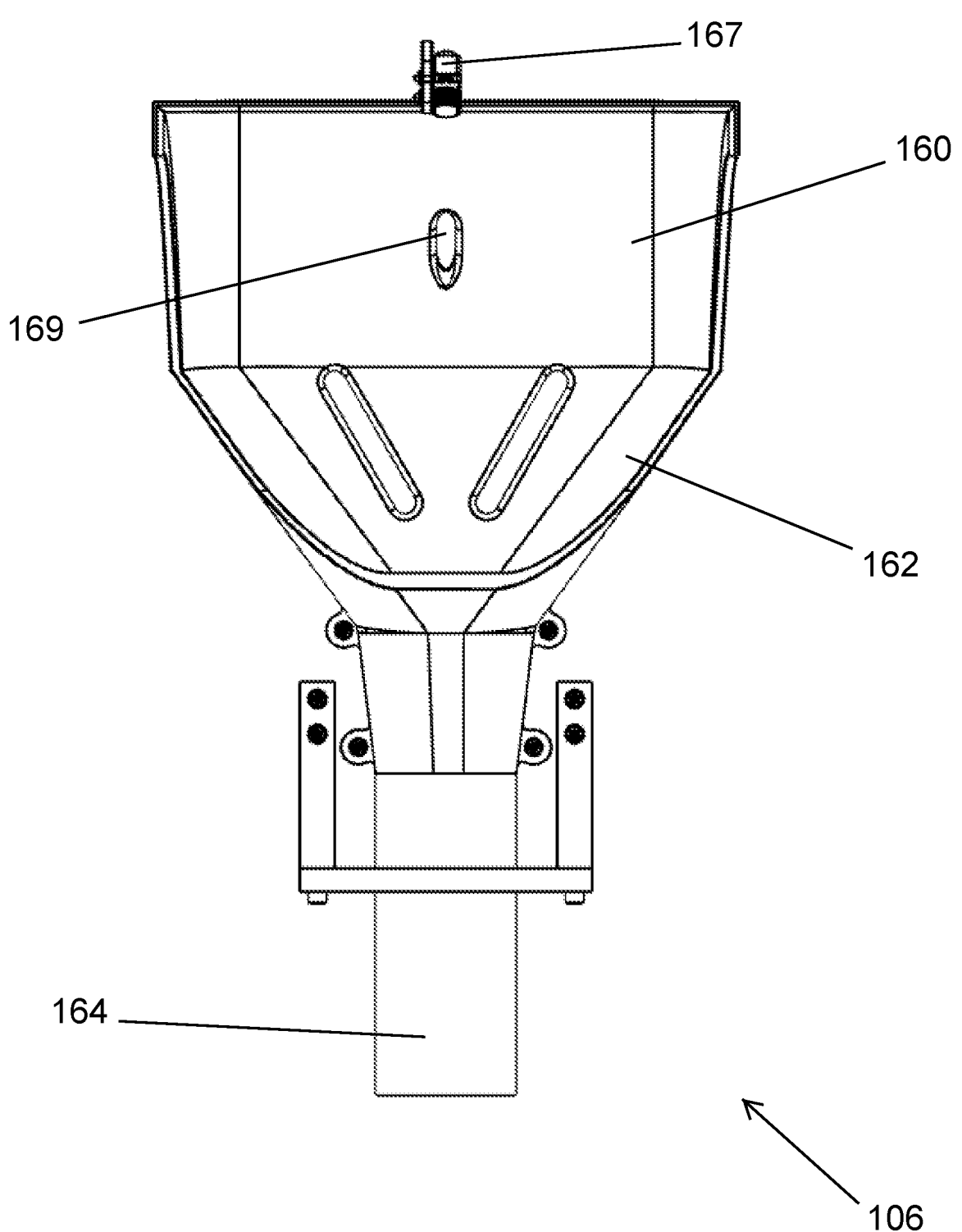
FIG. 21 shows a front view of the orientation funnel of FIG. 18, according to an example embodiment of the present disclosure.

As shown in FIG. 20, the orientation funnel 106 may contain multiple sensors 165, 167 communicatively coupled to the controller. The first sensor 165 is configured to detect whether a container 114 has successfully passed through the exit port 164. In the illustrated embodiment, the first sensor 165 is oriented downwards through a hole 169 in the entrance section 160 and is angled towards the exit port 164. If the first sensor 165 is an optical sensor, a light beam 171 may shine through the exit port 164 to determine whether the container 114 has fallen through. If the first sensor 165 detects a container 114 that remains in the exit port 164 for predetermined period of time, the first sensor 165 communicates with the controller. In some embodiments, the controller 147 may stop the container orienting and sorting system 100 until the disruption is fixed.

In the illustrated embodiment, the second sensor 167 is oriented towards the cleated belt conveyor track 120 to determine is any container 114 on the cleated belt conveyor track 120 is stuck in any predetermined undesired position. If the second sensor 167 detects that a container 114 is located in the predetermined undesired position, the second sensor 167 communicates with the controller. In some embodiments, the controller 147 may stop the container orienting and sorting system 100 until the container 114 in the predetermined undesired position is removed.

With both the first and second sensors 165, 167, the type of sensor and the location of the sensor may be adjusted. For instance, the sensors 165, 167 may be optical sensors, micro switches, or any other sensors appropriate. In the illustrated embodiment, both the first and second sensors 165, 167 are optical sensors, though it should be appreciated that the identified sensor mechanisms in the application are exemplary and other sensor mechanisms may be added or omitted in other embodiments of the container orienting and sorting system 100.

The present disclosure further includes a method for aggregating and sorting containers in a funnel apparatus 500 as illustrated in FIG. 22. In a first step 502, at least one container is received in an entrance section located at a top end of the funnel apparatus having an entrance width, the entrance section including a first path on one side and a second path on an opposing side, the first path configured to receive containers in a horizontal orientation with a container opening facing a first direction, the second path configured to receive containers in the horizontal orientation with the container opening facing an opposite, second direction, the entrance section having a bend between 60° and 120° from a horizontal orientation to a vertical orientation. In a second step 504, at least one container is disposed into a mid-section of the funnel apparatus located between the entrance section and the exit port, the mid-section having a transitioning width that transitions from the entrance width to the exit port width, the transitioning width causing the at least one container to rotate from the horizontal orientation to the vertical orientation as the at least one container falls from the entrance section to the exit port. In a third step 506, at least one container is disposed into an exit port located at a bottom end of the funnel apparatus that is vertically oriented below the top end of the entrance section, the exit port width configured to enable the container in the vertical orientation to pass through.

Container Queue Apparatus Embodiment

Figure 23:
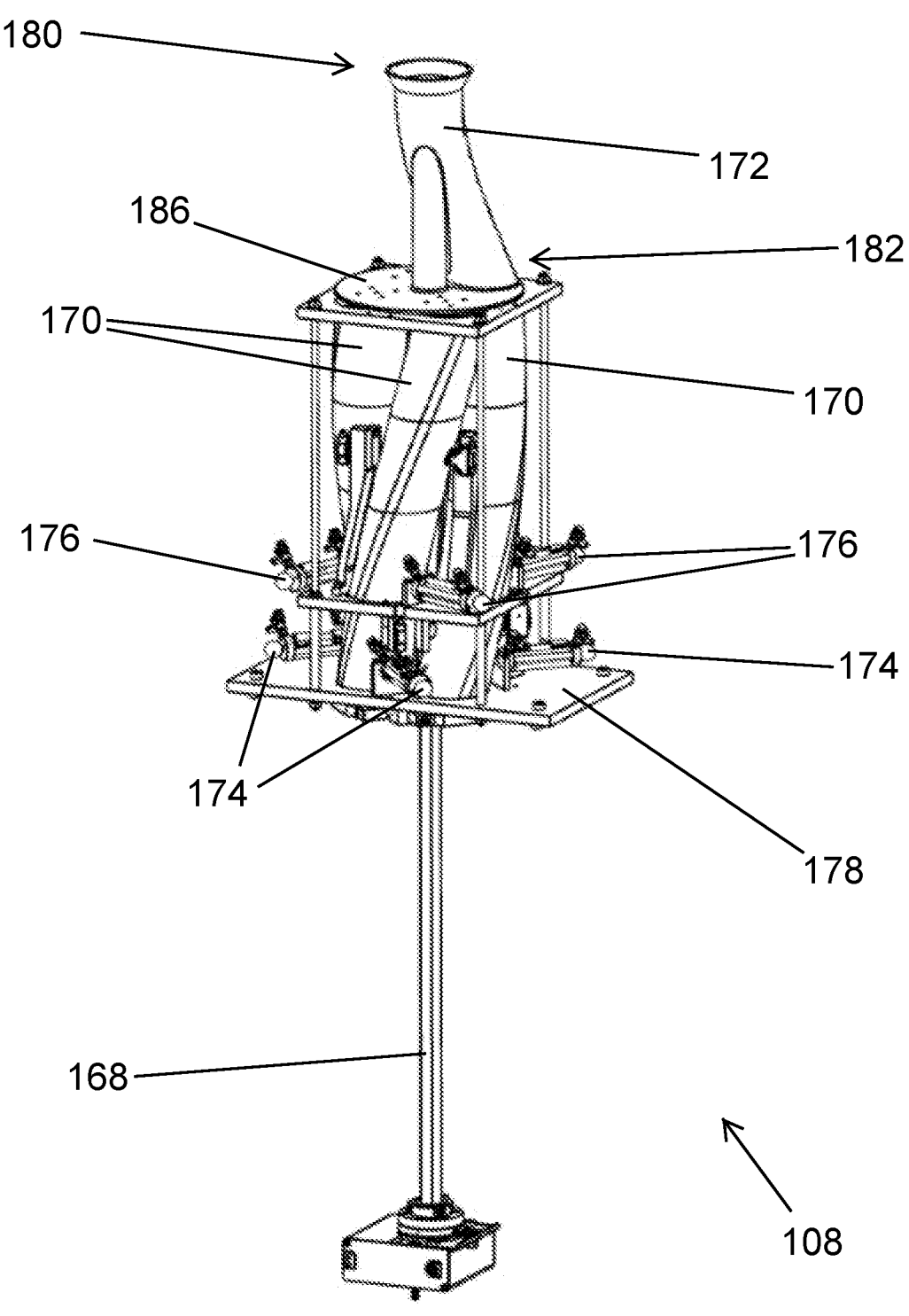
FIG. 23 shows an isometric view of the container queue apparatus, according to an example embodiment of the present disclosure.
Figure 24:
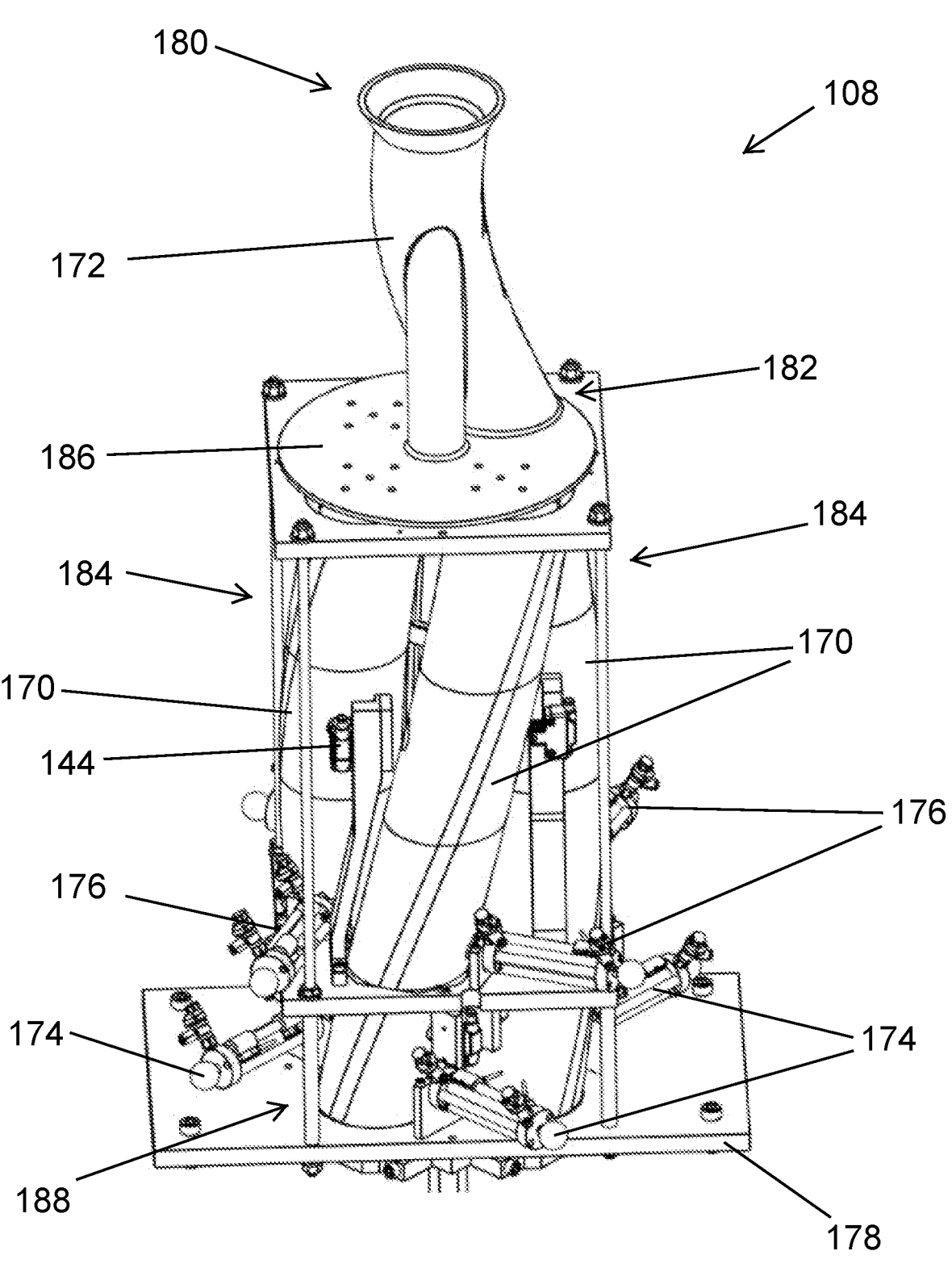
FIG. 24 shows an enlarged isometric view of the container queue apparatus of FIG. 23, according to an example embodiment of the present disclosure.
Figure 25:
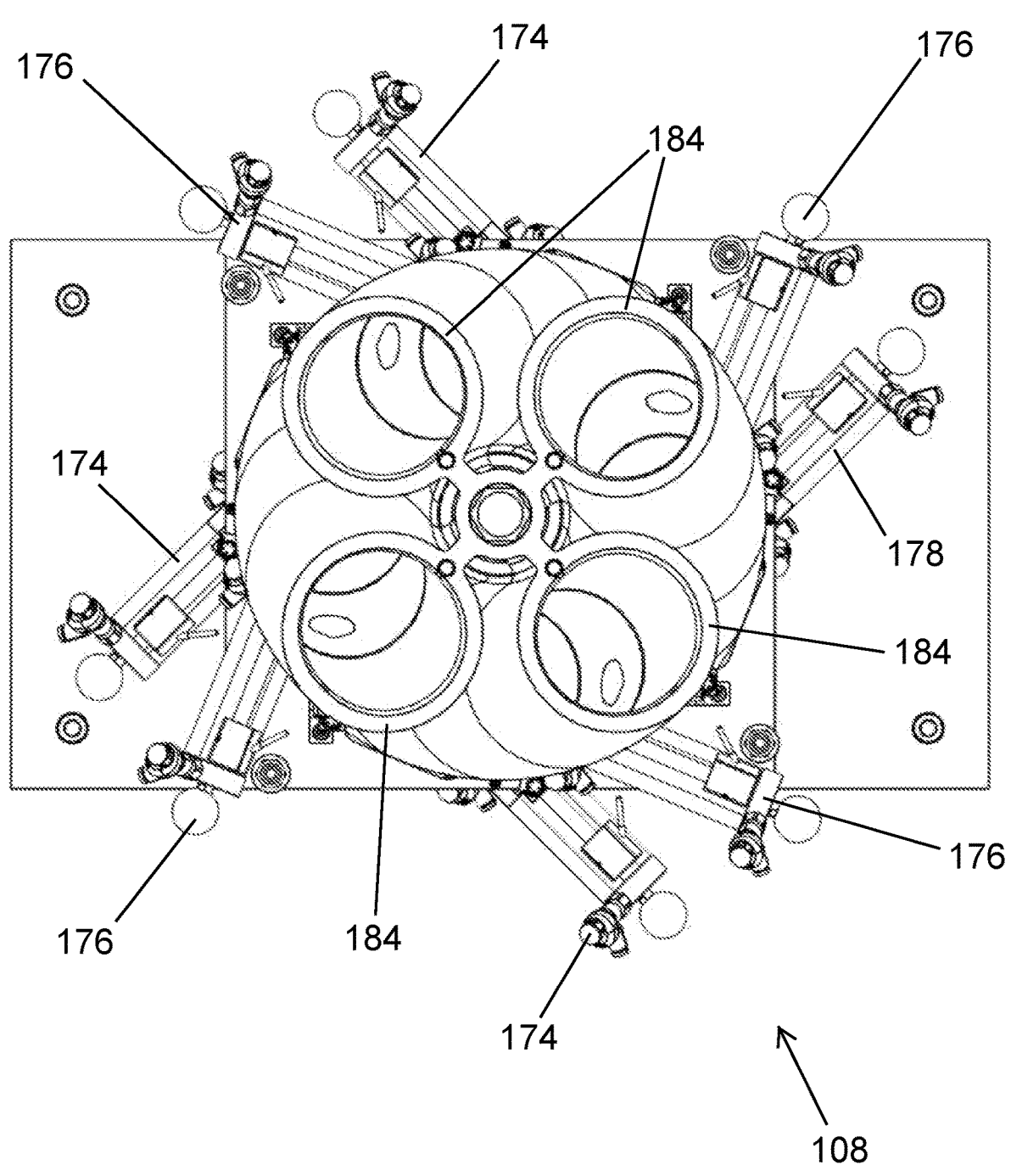
FIG. 25 shows a top view of the container queue apparatus of FIG. 23, according to an example embodiment of the present disclosure.

Upon exiting the orientation funnel 106, the containers 114 enter the container queue apparatus 108, as shown in FIGS. 23-25. The container queue apparatus 108 creates a stack of containers 114 able to be readily dispensed and utilized without becoming stuck to one another. Cylindrical containers 114 often become stuck to one another by telescoping as the closed end of one container 114 may enter the open end of another container 114 when stacked vertically. Because certain containers such as pill vials remain uniform throughout the length of the container 114, it may be difficult for a user or machine to separate the two containers 114. As a result, multiple containers 114 being stuck together may create inefficiencies or require stoppage of the container orienting and sorting system 100 to fix. The container queue apparatus 108 remedies this problem.

The container queue apparatus 108 includes a drive shaft 168, at least two queue cylinders 170, a switch tube 172, at least one stop actuator 174, and a hold actuator 176. In some embodiments, the container queue apparatus 108 including the queue cylinders 170, the switch tube 172, the stop actuator 174, and the hold actuator 176, is contained on a platform 178 attached to the main frame 110. The platform 178 may consist of metal framing, though it should be appreciated that the platform 178 may consist of any material appropriate to support the components within the container orienting and sorting system 100.

Toward the top end of the container queue apparatus 108 is the switch tube 172. The switch tube 172 has an input end 180 and an output end 182. The input end 180 of the switch tube 172 is adjacent to the exit port 164 of the orientation funnel 106 so that containers 114 pass directly from the exit port 164 into the switch tube 172. The switch tube 172 then bends towards the output end 182 at an angle that still allows the containers 114 to pass through from the exit port 164. The bend may be helical so as to cause the containers 114 to ride along the inner edges of the switch tube 172 instead of falling vertically and risking telescoping into another container 114. The output end 182 of the switch tube 172 aligns with the top end 184 of a queue cylinder 170 and the containers 114 continue to pass through to the queue cylinder 170.

The queue cylinders 170 are positioned in a vertical orientation and a located adjacent to one another. The top ends of each queue cylinder 170 are at the same height. In some embodiments, there are two queue cylinders 170. In other embodiments, there may be four queue cylinders 170. It should be appreciated that the number of queue cylinders 170 in the container queue apparatus 108 may differ in other embodiments. The number of queue cylinders 170 may depend on the how fast the container orienting and sorting system 100 requires containers 114 to pass through the container queue apparatus 108 and how fast the drive shaft 168 may go. The use of four queue cylinders 170 in the description below is purely exemplary.

The queue cylinders 170 are configured to enable containers 114 to pass through. While the shape of the queue cylinders 170 may vary, the queue cylinders 170 are shaped such that the containers 114 may ride along the inner edges of the queue cylinder 170 instead of falling vertically and risking telescoping into another container 114. In the illustrated embodiment, the queue cylinders 170 have a partial twist that creates a helical shape.

A sensor 144 is configured to detect when a queue cylinder 170 fills with containers 114. The type of sensor 144 and the location of the sensor 144 may vary. For instance, the sensor 144 may be an optical sensor, a micro switch, or any sensor appropriate to determine when the queue cylinder 170 is full. In one such embodiment, the sensor 144 is an optical sensor located at a distance from the queue cylinder 170 pointed perpendicularly to the top end 184 of the queue cylinder 170. When the optical sensor detects a container 114 that remains within the queue cylinder 170 for a predetermined period of time, such as a half of a second, the sensor 144 sends instructions to the drive shaft 168 that the queue cylinder 170 is full. It should be appreciated that the identified sensor mechanisms in the application are exemplary and other sensor mechanisms may be added or omitted in other embodiments of the container queue apparatus 108.

The sensor 144 is communicatively coupled to a controller. This controller 147 may be the same controller 147 used in the air sort station 134 or may be a second controller 147 independent of the air sort station 134 controller. The controller 147 can actuate various components within the container orienting and sorting system 100 which may include motors, pneumatic slides, conveyors, gantries, or valves. Here, the controller 147 is communicatively coupled with a drive shaft 168.

When one queue cylinder 170 fills with containers 114, the controller 147 sends movement instructions to the drive shaft 168 which rotates the switch tube 172 about the drive shaft 168 to align with the top end of a different queue cylinder 170. The top end 184 of the switch tube 172 remains aligned with the exit port 164 of the orientation funnel 106. The output end 182 of the switch tube 172 aligns with the top end of a different queue cylinder 170 which allows the second queue cylinder 170 to fill with containers 114. In some embodiments, the switch tube 172 may be placed within a cylindrical hole of a lid 186. The lid 186 is used to cover all other top ends 184 of queue cylinders 170 while the queue cylinders 170 are not in use. The cylindrical hole of the lid 186 allows containers 114 to pass through the switch tube 172 into the currently aligned queue cylinder 170.

The drive shaft 168 is provided in a vertical orientation. In the illustrated embodiment, the drive shaft 168 is affixed to the platform 178. The queue cylinders 170 may be positioned on opposing sides of the drive shaft 168. The switch tube 172 is connected to an end of the drive shaft 168 such that the switch tube 172 rotates when the drive shaft 168 is in operation. The drive shaft 168 is powered by a motor or other related actuator. In some embodiments, the motor is the same as the motor that powers both the cleated belt conveyor track 120 and the cam track 150. In other embodiments, the motor is an independent motor that operates separately from the motor powering the cleated belt conveyor track 120 and the cam track 150. It should be appreciated that the motor identified within the application is purely exemplary and that other motors or actuators may be added or omitted in other embodiments of the container queue apparatus 108. In other embodiments, the drive shaft 168 may be replaced with air cylinders, hydraulic cylinders, or solenoids to move the switch tube 172.

In some embodiments, the container queue apparatus 108 includes at least one hold actuator 176 located at a bottom end 188 of the queue cylinder 170. There may be a hold actuator 176 for each queue cylinder 170. The hold actuator 176 may be a pneumatic cylinder or other mechanism capable of suspending the flow of containers 114 down the container queue apparatus 108. In embodiments where the hold actuator 176 is a pneumatic cylinder, the pneumatic cylinder arm extends perpendicularly into the bottom end 188 of the queue cylinder 170 to catch containers 114 from falling out the bottom end of the queue cylinder 170.

Similarly, below the hold actuators 176 and further down the bottom end 188 of the queue cylinder 170 is at least one stop actuator 174. There may be a stop actuator 174 for each queue cylinder 170. The stop actuator 174 is positioned adjacent to a bottom end 188 of the respective queue cylinder 170 and configured to release a container 114 located at the bottom end 188 of the at least two queue cylinders 170 when in an open position. The stop actuator 174 may be a pneumatic cylinder or other mechanism capable of suspending the flow of containers 114 down the container queue apparatus 108. In embodiments where the stop actuator 174 is a pneumatic cylinder, the pneumatic cylinder arm extends perpendicularly into the bottom end 188 of the queue cylinder 170 to catch containers 114 from falling out the bottom end 188 of the queue cylinder 170.

The present disclosure further includes a method for aggregating and sorting containers in a container queue apparatus 600 as illustrated in FIG. 26. In a first step 602, at least one container is received in a switch tube connected to a drive shaft, the switch tube configured to rotate about the drive shaft to align with top ends of the at least two queue cylinders and configured to enable containers to pass through to one of the queue cylinders to which the switch tube is aligned. In a second step 604, the at least one container is deposited within at least one queue cylinder positioned in a vertical orientation on opposing sides of the drive shaft, the at least one queue cylinder configured to enable containers to pass through.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A container sorting apparatus comprising:
a transport mechanism configured to transport containers from a first end located adjacent to a loading section to a second end located at a fixed distance from the loading section;
a bumper rail located adjacent to a first side of the transport mechanism;
at least one air nozzle located adjacent to an opposite, second side of the transport mechanism across from a portion of the bumper rail, the at least one air nozzle connected to a pressurized air source and configured to blow pressurized air toward the bumper rail, the transport mechanism configured such that the containers are located on the second side before reaching the at least one air nozzle;
at least one valve fluidly coupled between the pressurized air source and the at least one air nozzle, the at least one valve configured to regulate a flow of the pressurized air; and
a sensor operable with a controller configured to:
detect whether an open end or a closed end of each of the containers faces the sensor, and
transmit a signal when the closed end of the container faces the sensor causing the at least one valve to open, thereby causing the pressurized air to move the container laterally from the second side of the transport mechanism toward the bumper rail such that:
containers with the open end facing the sensor are located on the second side of the transport mechanism when those containers reach the second end of the transport mechanism for stacking, and
the containers with the closed end facing the sensor are located on the first side of the transport mechanism or at a center of the transport mechanism when those containers reach the second end of the transport mechanism for stacking.

2. The container sorting apparatus of claim 1, wherein the transport mechanism is configured to transport the containers past the at least one air nozzle.

3. The container sorting apparatus of claim 1, wherein the second end of the transport mechanism is located at a higher elevation than the first end.

4. The container sorting apparatus of claim 1, wherein the transport mechanism is a cleated belt positioned along an incline, the cleated belt defining rows to hold containers in a horizontal orientation, the cleated belt configured to receive containers at the loading section located at a lower end of the incline and dispense the containers at a dispense section located at an upper end of the incline.

5. The container sorting apparatus of claim 4, wherein the at least one air nozzle is oriented to release pressurized air perpendicularly to the cleated belt.

6. The container sorting apparatus of claim 1, wherein the sensor is an optical sensor.

7. The container sorting apparatus of claim 1, wherein the sensor is a micro switch.

8. The container sorting apparatus of claim 1, further comprising a main frame to which the transport mechanism is mounted.

9. The container sorting apparatus of claim 1, further comprising a valve manifold to contain the at least one valve.

10. A container sorting apparatus comprising:
a transport mechanism configured to transport containers from a first end located adjacent to a loading section to a second end located at a fixed distance from the loading section;
a bumper rail located adjacent to a first side of the transport mechanism;
at least one air nozzle located adjacent to an opposite, second side of the transport mechanism across from a portion of the bumper rail, the at least one air nozzle connected to a pressurized air source and configured to blow pressurized air toward the bumper rail;
at least two valves fluidly coupled between the pressurized air source and the at least one air nozzle, the at least two valves configured to regulate a flow of the pressurized air; and
a sensor configured to:

detect whether an open end or a closed end of a container faces the sensor, and transmit a signal when the closed end of the container faces the sensor causing the at least two valves to open, thereby causing the pressurized air to move the container laterally toward the bumper rail.

11. A method for aggregating and sorting containers in a container sorter apparatus comprising:

transporting at least one container by a transport mechanism from a first end located adjacent to a loading section to a second end located at a fixed distance from the loading section, the transport mechanism configured such that the containers are located on a second side before reaching at least one air nozzle;

detecting whether an open end or a closed end of at least one container faces a sensor adjacent to the transport mechanism; and transmitting a signal when the closed end of a container faces the sensor causing at least one valve fluidly coupled between a pressurized air source and the at least one air nozzle, to open, thereby causing the pressurized air to move the container laterally from the second side of the transport mechanism toward a bumper rail located adjacent to a first side of the transport mechanism such that:

the containers with the open end facing the sensor are located on the second side of the transport mechanism when those containers reach the second end of the transport mechanism for stacking, and the containers with the closed end facing the sensor are located on the first side of the transport mechanism or at a center of the transport mechanism when those containers reach the second end of the transport mechanism for stacking, wherein the at least one valve is configured to regulate a flow of the pressurized air.

12. The method of claim 11, wherein the transport mechanism is configured to transport the containers past the at least one air nozzle.

13. The method of claim 11, wherein the second end of the transport mechanism is located at a higher elevation than the first end.

14. The method of claim 11, wherein the transport mechanism is a cleated belt positioned along an incline, the cleated belt defining rows to hold containers in a horizontal orientation, the cleated belt configured to receive containers at the loading section located at a lower end of the incline and dispense the containers at a dispense section located at an upper end of the incline.

15. The method of claim 14, wherein the at least one air nozzle is oriented to release pressurized air perpendicularly to the cleated belt.

16. The method of claim 11, wherein the sensor is an optical sensor.

17. The method of claim 11, wherein the sensor is a micro switch.

18. The method of claim 11, further comprising a main frame to which the transport mechanism is mounted.

19. The method of claim 11, further comprising a valve manifold to contain the at least one valve.

20. The method of claim 11, wherein the at least one air nozzle is coupled to more than one valve.

* * * * *